US012183273B2

(12) United States Patent
Kim et al.

(10) Patent No.: US 12,183,273 B2

(45) Date of Patent: Dec. 31, 2024

(54) EMISSION DRIVER AND DISPLAY DEVICE

(71) Applicants: Samsung Display Co., LTD., Yongin-si (KR); Research & Business Foundation SUNGKYUNKWAN UNIVERSITY, Suwon-si (KR)

(72) Inventors: Haemin Kim, Yongin-si (KR); Yong-Sang Kim, Yongin-si (KR); Kyunghoon Chung, Yongin-si (KR); Eun Kyo Jung, Gunpo-si (KR); Hwarim Im, Seoul (KR)

(73) Assignees: SAMSUNG DISPLAY CO., LTD., Yongin-si (KR); RESEARCH & BUSINESS FOUNDATION SUNGKYUNKWAN UNIVERSITY, Suwon-si (KR)

( * ) Notice: Subject to any disclaimer, the term of this patent is extended or adjusted under 35 U.S.C. 154(b) by 23 days.

(21) Appl. No.: 18/329,776

(22) Filed: Jun. 6, 2023

(65) Prior Publication Data

US 2024/0346997 A1 Oct. 17, 2024

(30) Foreign Application Priority Data

Apr. 13, 2023 (KR) ........................ 10-2023-0048569

(51) Int. Cl.
*G09G 3/3225* (2016.01)

(52) U.S. Cl.
CPC ... *G09G 3/3225* (2013.01); *G09G 2300/0426* (2013.01); *G09G 2300/0861* (2013.01); *G09G 2310/08* (2013.01)

(58) Field of Classification Search
CPC ......... G09G 3/3225; G09G 2300/0426; G09G 2300/0861; G09G 2310/08
See application file for complete search history.

(56) References Cited

U.S. PATENT DOCUMENTS

| | | | | |
|---|---|---|---|---|
| 10,748,471 B2 * | 8/2020 | Hwang | G11C 19/28 |
| 10,991,302 B1 * | 4/2021 | Park | G09G 3/20 |
| 11,610,541 B1 * | 3/2023 | Kim | G09G 3/3233 |
| 11,626,070 B2 * | 4/2023 | Yun | G09G 3/3266<br>345/82 |
| 2017/0186363 A1 * | 6/2017 | Park | G09G 3/3266 |

(Continued)

FOREIGN PATENT DOCUMENTS

| | | |
|---|---|---|
| KR | 10-1388286 | 4/2014 |
| KR | 10-2021-0077087 | 6/2021 |
| KR | 10-2022-0137200 | 10/2022 |

*Primary Examiner* — Ariel A Balaoing
(74) *Attorney, Agent, or Firm* — KILE PARK REED & HOUTTEMAN PLLC

(57) ABSTRACT

An emission driver includes stages. At least one of the stages has a carry control node outputting a carry signal and an emission control node outputting an emission signal that are separated. Further, a second low gate voltage may be used that may be lower that a first low gate voltage. Further, transistors between each of the carry and emission control nodes and a second low voltage line transferring the second low gate voltage may have a series two transistor structure. Further, a transistor outputting the second low gate voltage as the carry signal may be repeatedly turned on and off in response to an inverted low clock signal. Accordingly, operation reliability of the emission driver of the display device may be improved.

20 Claims, 13 Drawing Sheets

(56) References Cited

U.S. PATENT DOCUMENTS

| | | | | |
|---|---|---|---|---|
| 2018/0190197 | A1* | 7/2018 | Chang | H10K 59/1216 |
| 2019/0164498 | A1* | 5/2019 | Jang | G09G 3/3266 |
| 2021/0110774 | A1* | 4/2021 | Cho | G09G 3/3266 |
| 2021/0248961 | A1* | 8/2021 | Yang | G09G 3/3233 |
| 2021/0312855 | A1* | 10/2021 | Jeong | G09G 3/3233 |
| 2022/0208109 | A1* | 6/2022 | Seo | G09G 3/3266 |
| 2023/0206827 | A1* | 6/2023 | Kim | G11C 19/28 |
| 2024/0177677 | A1* | 5/2024 | Kim | G09G 3/3266 |

* cited by examiner

EMISSION DRIVER AND DISPLAY DEVICE

CROSS-REFERENCE TO RELATED APPLICATION(S)

This application claims priority under 35 USC § 119 from Korean Patent Application No. 10-2023-0048569 filed on Apr. 13, 2023 in the Korean Intellectual Property Office, the entire content of which are incorporated herein by reference.

BACKGROUND

1. Technical Field

Embodiments of the disclosure relate to an emission driver and a display device including the emission driver.

2. Description of the Related Art

A display device, such as an organic light emitting diode (OLED) display device, may include a display panel having multiple pixels, a data driver providing data signals to the multiple pixels, a scan driver providing scan signals to the multiple pixels, an emission driver providing emission signals to the multiple pixels, and a controller controlling the data driver, the scan driver and the emission driver.

Recently, an OLED display device in which each pixel includes oxide transistors or n-type metal oxide semiconductor (NMOS) transistors is being developed. Accordingly, an emission driver suitable for the pixel including the oxide transistors or the NMOS transistors may be required.

SUMMARY

Some embodiments provide an emission driver having improved operation reliability.

Some embodiments provide a display device including an emission driver having improved operation reliability.

According to embodiments, there may be provided an emission driver including multiple stages. At least one of the multiple stages may include a carry node charging circuit that charges a carry control node based on a previous carry signal and an inverted clock signal, an emission node charging circuit that charges an emission control node based on an inverted low clock signal and the inverted clock signal, a carry node discharging circuit that discharges the carry control node based on a next carry signal, a voltage of the emission control node and a second low gate voltage, an emission node discharging circuit that discharges the emission control node based on a voltage of the carry control node and the second low gate voltage, and an output circuit that performs a bootstrapping operation on the carry control node that is charged to a high gate voltage, that outputs a carry signal based on the voltage of the carry control node on which the bootstrapping operation is performed, that performs a bootstrapping operation on the emission control node that is charged to the high gate voltage, and that outputs an emission signal based on the voltage of the emission control node on which the bootstrapping operation is performed.

In embodiments, the output circuit may include a first capacitor that is used to perform the bootstrapping operation on the carry control node, and a second capacitor that is used to perform the bootstrapping operation on the emission control node.

In embodiments, the first capacitor may include a first electrode electrically connected to the carry control node, and a second electrode electrically connected to a carry output node at which the carry signal is output, and the second capacitor may include a first electrode receiving a low clock signal, and a second electrode electrically connected to the emission control node.

In embodiments, the carry node charging circuit may transfer the inverted clock signal to the carry control node in response to the previous carry signal.

In embodiments, the carry node charging circuit may include a first transistor including a gate receiving the previous carry signal, a first terminal receiving the inverted clock signal, and a second terminal electrically connected to the carry control node.

In embodiments, the emission node charging circuit may transfer the inverted clock signal to the emission control node in response to the inverted low clock signal.

In embodiments, the emission node charging circuit may include a first transistor may include a gate receiving the inverted low clock signal, a first terminal receiving the inverted clock signal, and a second terminal electrically connected to the emission control node.

In embodiments, the carry node discharging circuit may transfer the second low gate voltage to the carry control node in response to the next carry signal, and may transfer the second low gate voltage to the carry control node in response to the voltage of the emission control node.

In embodiments, the carry node discharging circuit may include a first transistor including a gate receiving the next carry signal, a first terminal electrically connected to the carry control node, and a second terminal electrically connected to a first intermediate node, a second transistor including a gate receiving the next carry signal, a first terminal electrically connected to the first intermediate node, and a second terminal receiving the second low gate voltage, a third transistor including a gate electrically connected to the emission control node, a first terminal electrically connected to the carry control node, and a second terminal electrically connected to the first intermediate node, and a fourth transistor including a gate electrically connected to the emission control node, a first terminal electrically connected to the first intermediate node, and a second terminal receiving the second low gate voltage.

In embodiments, the carry node discharging circuit may further include a fifth transistor including a gate electrically connected to the carry control node, a first terminal receiving the high gate voltage, and a second terminal electrically connected to the first intermediate node.

In embodiments, the emission node discharging circuit may transfer the second low gate voltage to the emission control node in response to the voltage of the carry control node.

In embodiments, the emission node discharging circuit may include a first transistor including a gate electrically connected to the carry control node, a first terminal electrically connected to the emission control node, and a second terminal electrically connected to a second intermediate node, and a second transistor including a gate electrically connected to the carry control node, a first terminal electrically connected to the second intermediate node, and a second terminal receiving the second low gate voltage.

In embodiments, a voltage difference between the voltage of the emission control node on which the bootstrapping operation is performed and the second low gate voltage may be distributed among the first transistor and the second transistor.

In embodiments, the emission node discharging circuit may further include a third transistor including a gate electrically connected to the emission control node, a first terminal receiving the high gate voltage, and a second terminal electrically connected to the second intermediate node.

In embodiments, the output circuit may output the high gate voltage as the carry signal in response to the voltage of the carry control node on which the bootstrapping operation is performed, may output the second low gate voltage as the carry signal in response to the inverted low clock signal, may output the high gate voltage as the emission signal in response to the voltage of the emission control node on which the bootstrapping operation is performed, and may output a first low gate voltage as the emission signal in response to the voltage of the carry control node.

In embodiments, the second low gate voltage may be lower than the first low gate voltage.

In embodiments, the output circuit may include a first capacitor including a first electrode electrically connected to the carry control node, and a second electrode electrically connected to a carry output node at which the carry signal is output, an first transistor including a gate electrically connected to the carry control node, a first terminal receiving a low clock signal, and a second terminal electrically connected to the carry output node, a second transistor including a gate receiving the inverted low clock signal, a first terminal electrically connected to the carry output node, and a second terminal receiving the second low gate voltage, a second capacitor including a first electrode receiving the low clock signal, and a second electrode electrically connected to the emission control node, a third transistor including a gate electrically connected to the emission control node, a first terminal receiving the high gate voltage, and a second terminal electrically connected to an emission output node at which the emission signal is output, and a fourth transistor including a gate receiving the carry control node, a first terminal electrically connected to the emission output node, and a second terminal receiving a first low gate voltage.

In embodiments, the second transistor may be repeatedly turned on and off in response to the inverted low clock signal.

According to embodiments, there is provided an emission driver including a plurality of stages. At least one of the plurality of stages may include a first transistor including a gate receiving a previous carry signal, a first terminal receiving an inverted clock signal, and a second terminal electrically connected to a carry control node, a second transistor including a gate receiving a next carry signal, a first terminal electrically connected to the carry control node, and a second terminal electrically connected to a first intermediate node, a third transistor including a gate receiving the next carry signal, a first terminal electrically connected to the first intermediate node, and a second terminal receiving a second low gate voltage, a fourth transistor including a gate electrically connected to the carry control node, a first terminal receiving a high gate voltage, and a second terminal electrically connected to the first intermediate node, a fifth transistor including a gate receiving an inverted low clock signal, a first terminal receiving the inverted clock signal, and a second terminal electrically connected to an emission control node, a sixth transistor including a gate electrically connected to the emission control node, a first terminal electrically connected to the carry control node, and a second terminal electrically connected to the first intermediate node, a seventh transistor including a gate electrically connected to the emission control node, a first terminal electrically connected to the first intermediate node, and a second terminal receiving the second low gate voltage, an eighth transistor including a gate electrically connected to the emission control node, a first terminal receiving the high gate voltage, and a second terminal electrically connected to a second intermediate node, a ninth transistor including a gate electrically connected to the carry control node, a first terminal electrically connected to the emission control node, and a second terminal electrically connected to the second intermediate node, a tenth transistor including a gate electrically connected to the carry control node, a first terminal electrically connected to the second intermediate node, and a second terminal receiving the second low gate voltage, a first capacitor including a first electrode electrically connected to the carry control node, and a second electrode electrically connected to a carry output node, an eleventh transistor including a gate electrically connected to the carry control node, a first terminal receiving a low clock signal, and a second terminal electrically connected to the carry output node, a twelfth transistor including a gate receiving the inverted low clock signal, a first terminal electrically connected to the carry output node, and a second terminal receiving the second low gate voltage, a second capacitor including a first electrode receiving the low clock signal, and a second electrode electrically connected to the emission control node, a thirteenth transistor including a gate electrically connected to the emission control node, a first terminal receiving the high gate voltage, and a second terminal electrically connected to an emission output node, and a fourteenth transistor including a gate receiving the carry control node, a first terminal electrically connected to the emission output node, and a second terminal receiving a first low gate voltage.

According to embodiments, there is provided a display device that may include a display panel that may include a plurality of pixels, a data driver that provides a plurality of data signals to the plurality of pixels, a scan driver that provides a plurality of scan signals to the plurality of pixels, an emission driver that may include a plurality of stages that provide a plurality of emission signals to the plurality of pixels, and a controller that controls the data driver, the scan driver and the emission driver. At least one of the plurality of stages may include a carry node charging circuit that charges a carry control node based on a previous carry signal and an inverted clock signal, an emission node charging circuit that charges an emission control node based on an inverted low clock signal and the inverted clock signal, a carry node discharging circuit that discharges the carry control node based on a next carry signal, a voltage of the emission control node and a second low gate voltage, an emission node discharging circuit that discharges the emission control node based on a voltage of the carry control node and the second low gate voltage, and an output circuit that performs a bootstrapping operation on the carry control node that is charged to a high gate voltage, that outputs a carry signal based on the voltage of the carry control node on which the bootstrapping operation is performed, that performs a bootstrapping operation on the emission control node that is charged to the high gate voltage, and that outputs a corresponding one of the plurality of emission signals based on the voltage of the emission control node on which the bootstrapping operation is performed.

As described above, in an emission driver and a display device according to embodiments, a carry control node that outputs a carry signal and an emission control node that outputs an emission signal may be separated from each other. Further, a second low gate voltage that may be used as a low voltage of an input signal and the carry and emission control nodes may be lower that a first low gate voltage that is used as a low voltage of the emission signal. Further, transistors between each of the carry and emission control nodes and a second low voltage line transferring the second low gate voltage may have a series two transistor (STT) structure. Further, a twelfth transistor that outputs the second low gate voltage as the carry signal may be repeatedly turned on and off in response to an inverted low clock signal. Accordingly, operation reliability of the emission driver according to embodiments may be improved.

BRIEF DESCRIPTION OF THE DRAWINGS

An additional appreciation according to the embodiments of the disclosure will become more apparent by describing in detail the embodiments thereof with reference to the accompanying drawings, wherein.

DETAILED DESCRIPTION OF THE EMBODIMENTS

Figure 1:
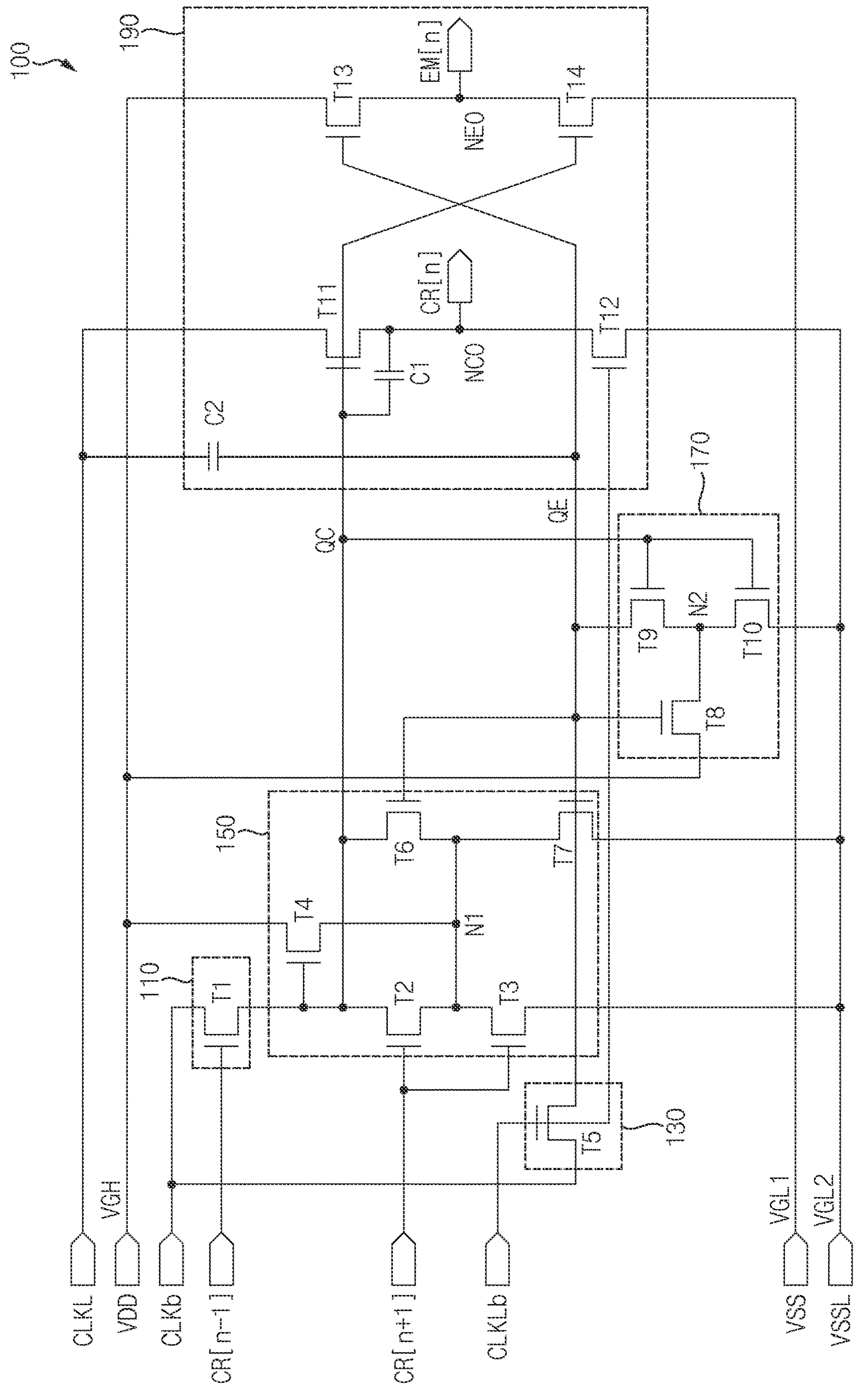
FIG. 1 is a schematic diagram of an equivalent circuit illustrating a stage included in an emission driver according to embodiments.

In the following description, for the purposes of explanation, numerous specific details are set forth in order to provide a thorough understanding of various embodiments or implementations of the disclosure. As used herein "embodiments" and "implementations" are interchangeable words that are non-limiting examples of devices or methods disclosed herein. It is apparent, however, that various embodiments may be practiced without these specific details or with one or more equivalent arrangements. Here, various embodiments do not have to be exclusive nor limit the disclosure. For example, specific shapes, configurations, and characteristics of an embodiment may be used or implemented in an embodiment.

Unless otherwise specified, the illustrated embodiments are to be understood as providing features of the disclosure. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be predisposed differently from the described order. For example, two consecutively described processes may be predisposed substantially at the same time or predisposed in an order opposite to the described order. Also, like reference numerals and/or reference characters denote like elements.

When an element, such as a layer, is referred to as being "on," "connected to," or "electrically connected to" another element or layer, it may be directly on, connected to, or electrically connected to the other element or layer or intervening elements or layers may be present. When, however, an element or layer is referred to as being "directly on," "directly connected to," or "directly electrically connected to" another element or layer, there are no intervening elements or layers present. To this end, the term "connected" may refer to physical, electrical, and/or fluid connection, with or without intervening elements. Also, when an element is referred to as being "in contact" or "contacted" or the like to another element, the element may be in "electrical contact" or in "physical contact" with another element; or in "indirect contact" or in "direct contact" with another element. Further, the X-axis, the Y-axis, and the Z-axis may not be limited to three axes of a rectangular coordinate system, such as the x, y, and z axes, and may be interpreted in a broader sense. For example, the X-axis, the Y-axis, and the Z-axis may be perpendicular to one another, or may represent different directions that may not be perpendicular to one another.

For the purposes of this disclosure, "at least one of A and B" may be construed as A only, B only, or any combination of A and B. Also, "at least one of X, Y, and Z" and "at least one selected from the group consisting of X, Y, and Z" may be construed as X only, Y only, Z only, or any combination of two or more of X, Y, and Z. As used herein, the term "and/or" includes any and all combinations of one or more of the associated listed items. A description that a component is "configured to" perform a specified operation may be defined as a case where the component is constructed and arranged with structural features that can cause the component to perform the specified operation.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various embodiments are described herein with reference to sectional and/or exploded illustrations that are schematic illustrations of embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, may not be necessarily intended to be limiting.

As customary in the field, some embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be disposed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, portion, and/or module of some embodiments may be physically separated into two or more interacting and discrete blocks, units, and/or modules without departing from the scope of the inventive concepts. Further, the blocks, units, and/or modules of some embodiments may be physically combined into more complex blocks, units, and/or modules without departing from the scope of the inventive concepts.

Unless otherwise defined or implied herein, all terms (including technical and scientific terms) used herein have the same meaning as commonly understood by those skilled in the art to which this disclosure pertains. It will be further understood that terms, such as those defined in commonly used dictionaries, should be interpreted as having a meaning that is consistent with their meaning in the context of the relevant art and the disclosure, and should not be interpreted in an ideal or excessively formal sense unless clearly so defined herein. Hereinafter, embodiments of the disclosure will be described in detail with reference to the accompanying drawings. FIG. 1 is a schematic diagram of an equivalent circuit illustrating a stage included in an emission driver according to embodiments. Referring to FIG. 1, an emission driver according to embodiments may include multiple stages, and at least one stage 100 of the multiple stages may include a carry node charging circuit 110, an emission node charging circuit 130, a carry node discharging circuit 150, an emission node discharging circuit 170 and an output circuit 190.

The carry node charging circuit 110 may charge a carry control node QC based on a previous carry signal CR[n−1] and an inverted clock signal CLKb. The carry node charging circuit 110 may charge the carry control node QC to a high gate voltage VGH by transferring the inverted clock signal CLKb having a high gate voltage VGH to the carry control node QC in response to the previous carry signal CR[n−1] having the high gate voltage VGH. In some embodiments, a first stage of the multiple stages of the emission driver may receive a start signal as the previous carry signal CR[n−1], and each of the remaining stages of the multiple stages may receive a carry signal of an immediately previous stage as the previous carry signal CR[n−1]. However, the previous carry signal CR[n−1] may not be limited thereto. Further, in some embodiments, the inverted clock signal CLKb may periodically transition between the high gate voltage VGH and a first low gate voltage VGL1.

In some embodiments, the carry node charging circuit 110 may include a first transistor T1 that transfers the inverted clock signal CLKb to the carry control node QC in response to the previous carry signal CR[n−1]. For example, the first transistor T1 may include a gate receiving the previous carry signal CR[n−1], a first terminal receiving the inverted clock signal CLKb, and a second terminal electrically connected to the carry control node QC.

The emission node charging circuit 130 may charge an emission control node QE based on an inverted low clock signal CLKLb and the inverted clock signal CLKb. The emission node charging circuit 130 may charge the emission control node QE to the high gate voltage VGH by transferring the inverted clock signal CLKb having the high gate voltage VGH to the emission control node QE in response to the inverted low clock signal CLKLb having the high gate voltage VGH. In some embodiments, the inverted low clock signal CLKLb may have substantially the same phase as the inverted clock signal CLKb, and may periodically transition between the high gate voltage VGH and a second low gate voltage VGL2. Further, in some embodiments, the second low gate voltage VGL2 may be lower than the first low gate voltage VGL1. Thus, the inverted low clock signal CLKLb may have substantially the same phase and substantially the same high voltage as the inverted clock signal CLKb, but may have a low voltage lower than a low voltage of the inverted clock signal CLKb.

In some embodiments, the emission node charging circuit 130 may include a fifth transistor T5 that transfers the inverted clock signal CLKb to the emission control node QE in response to the inverted low clock signal CLKLb. For example, the fifth transistor T5 may include a gate receiving the inverted low clock signal CLKLb, a first terminal receiving the inverted clock signal CLKb, and a second terminal electrically connected to the emission control node QE.

The carry node discharging circuit 150 may discharge the carry control node QC based on a next carry signal CR[n+1], a voltage of the emission control node QE and the second low gate voltage VGL2. The carry node discharging circuit 150 may discharge the carry control node QC to the second low gate voltage VGL2 by transferring the second low gate voltage VGL2 of a second low voltage line VSSL to the carry control node QC in response to the next carry signal CR[n+1] having the high gate voltage VGH. Further, the carry node discharging circuit 150 may discharge the carry control node QC to the second low gate voltage VGL2 by transferring the second low gate voltage VGL2 of the second low voltage line VSSL to the carry control node QC in response to a charged voltage or a bootstrapped voltage of the emission control node QE. In some embodiments, the next carry signal CR[n+1] may be, but not be limited to, a carry signal of an immediately next stage.

In some embodiments, the carry node discharging circuit 150 may include second and third transistors T2 and T3 that transfer the second low gate voltage VGL2 to the carry control node QC in response to the next carry signal CR[n+1], and sixth and seventh transistors T6 and T7 that transfer the second low gate voltage VGL2 to the carry control node QC in response to the voltage of the emission control node QE. For example, the second transistor T2 may include a gate receiving the next carry signal CR[n+1], a first terminal electrically connected to the carry control node QC, and a second terminal electrically connected to a first intermediate node N1, and the third transistor T3 may include a gate receiving the next carry signal CR[n+1], a first terminal electrically connected to the first intermediate node N1, and a second terminal electrically connected to the second low voltage line VSSL transferring the second low gate voltage VGL2. Further, for example, the sixth transistor T6 may include a gate electrically connected to the emission control node QE, a first terminal electrically connected to the carry control node QC, and a second terminal electrically connected to the first intermediate node N1, and the seventh transistor T7 may include a gate electrically connected to the emission control node QE, a first terminal electrically connected to the first intermediate node N1, and second terminal electrically connected to the second low voltage line VSSL transferring the second low gate voltage VGL2.

In case that a voltage of the carry control node QC may be bootstrapped, a high drain-source voltage stress may be applied to a transistor electrically connected between the carry control node QC and the second low voltage line VSSL. However, in the stage 100 of the emission driver according to embodiments, two transistors (e.g., the second and third transistors T2 and T3 or the sixth and seventh transistors T6 and T7) electrically connected in series between the carry control node QC and the second low voltage line VSSL may be disposed. Therefore, even if the voltage of the carry control node QC is bootstrapped, the high drain-source voltage stress between the carry control node QC and the second low voltage line VSSL may be distributed among the second transistor T2 and the third transistor T3, and may be distributed among the sixth transistor T6 and the seventh transistor T7. Accordingly, a drain-source voltage stress applied to each of the second transistor T2, the third transistor T3, the sixth transistor T6 and the seventh transistor T7 may be reduced or minimized. In some embodiments, the two serially electrically connected transistors may be referred to as a series two transistor (STT) structure.

Further, in some embodiments, the carry node discharging circuit 150 may further include a fourth transistor T4 that transfers the high gate voltage VGH of a high voltage line VDD to the first intermediate node N1 between the second and third transistors T2 and T3 and between the sixth and seven transistors T6 and T7. For example, the fourth transistor T4 may include a gate electrically connected to the carry control node QC, a first terminal electrically connected to the high voltage line VDD transferring the high gate voltage VGH, and a second terminal electrically connected to the first intermediate node N1. In case that the voltage of the carry control node QC may be bootstrapped, since the fourth transistor T4 transfers the high gate voltage VGH to the first intermediate node N1 between the second and third transistors T2 and T3 and between the sixth and seventh transistors T6 and T7, the high drain-source voltage stress between the carry control node QC and the second low voltage line VSSL may be stably and efficiently distributed among the second and third transistors T2 and T3 and to the sixth and seventh transistors T6 and T7.

The emission node discharging circuit 170 may discharge the emission control node QE based on the voltage of the carry control node QC and the second low gate voltage VGL2. The emission node discharging circuit 170 may discharge the emission control node QE to the second low gate voltage VGL2 by transferring the second low gate voltage VGL2 of the second low voltage line VSSL to the emission control node QE in response to a charged voltage or a bootstrapped voltage of the carry control node QC.

In some embodiments, the emission node discharging circuit 170 may include ninth and tenth transistors T9 and T10 that transfer the second low gate voltage VGL2 to the emission control node QE in response to the voltage of the carry control node QC. For example, the ninth transistor T9 may include a gate electrically connected to the carry control node QC, a first terminal electrically connected to the emission control node QE, and a second terminal electrically connected to a second intermediate node N2, and the tenth transistor T10 may include a gate electrically connected to the carry control node QC, a first terminal electrically connected to the second intermediate node N2, and a second terminal electrically connected to the second low voltage line VSSL transferring the second low gate voltage VGL2.

In case that the voltage of the emission control node QE may be bootstrapped, a high drain-source voltage stress may be applied to a transistor electrically connected between the emission control node QE and the second low voltage line VSSL. However, in the stage 100 of the emission driver according to embodiments, the ninth and tenth transistors T9 and T10 having the STT structure may be disposed between the emission control node QE and the second low voltage line VSSL. Accordingly, even if the voltage of the emission control node QE is bootstrapped, a voltage difference between the bootstrapped voltage of the emission control node QE and the second low gate voltage VGL2, or the high drain-source voltage stress may be distributed among the ninth transistor T9 and the tenth transistor T10, and thus a drain-source voltage stress applied to each of the ninth transistor T9 and the tenth transistor T10 may be reduced or minimized.

Further, in some embodiments, the emission node discharging circuit 170 may further include an eighth transistor T8 that transfers the high gate voltage VGH of the high voltage line VDD to the second intermediate node N2 between the ninth and tenth transistors T9 and T10 in response to the bootstrapped voltage of the emission control node QE. For example, the eighth transistor T8 may include a gate electrically connected to the emission control node QE, a first terminal electrically connected to the high voltage line VDD transferring the high gate voltage VGH, and a second terminal electrically connected to the second intermediate node N2. In case that the voltage of the emission control node QE may be bootstrapped, since the eighth transistor T8 transfers the high gate voltage VGH to the second intermediate node N2 between the ninth and tenth transistors T9 and T10, the high drain-source voltage stress between the emission control node QE and the second low voltage line VSSL may be stably and efficiently distributed among the ninth and tenth transistors T9 and T10.

The output circuit 190 may perform a bootstrapping operation on the carry control node QC that may be charged to the high gate voltage VGH, may output a carry signal CR[n] based on the voltage of the carry control node QC on which the bootstrapping operation may be performed, may perform a bootstrapping operation on the emission control node QE that may be charged to the high gate voltage VGH, and may output an emission signal EM[n] based on the voltage of the emission control node QE on which the bootstrapping operation may be performed. Thus, in the stage 100 of the emission driver according to embodiments, the carry control node QC for outputting the carry signal CR[n] and the emission control node QE for outputting the emission signal EM[n] may be separated from each other.

In some embodiments, the output circuit 190 may include a first capacitor C1 for the bootstrapping operation on the carry control node QC and a second capacitor C2 for the bootstrapping operation on the emission control node QE. For example, the first capacitor C1 may include a first electrode electrically connected to the carry control node QC and a second electrode electrically connected to a carry output node NCO at which the carry signal CR[n] may be output, and the second capacitor C2 may include a first electrode receiving a low clock signal CLKL and a second electrode electrically connected to the emission control node QE. In case that the carry control node QC may be charged to the high gate voltage VGH, and the low clock signal CLKL having the second low gate voltage VGL2 may be output as the carry signal CR[n] at the carry output node NCO, if the low clock signal CLKL may be changed from the second low gate voltage VGL2 to the high gate voltage VGH, the voltage of the carry control node QC may be bootstrapped (or boosted) to a voltage higher than the high gate voltage VGH by the bootstrapping operation (or a coupling effect) of the first capacitor C1. Further, in case that the voltage of the emission control node QE may be charged to the high gate voltage VGH, and the low clock signal CLKL has the second low gate voltage VGL2, if the low clock signal CLKL may be changed from the second low gate voltage VGL2 to the high gate voltage VGH, the voltage of the emission control node QE may be bootstrapped (or boosted) to a voltage higher than the high gate voltage VGH by the bootstrapping operation (or a coupling effect) of the second capacitor C2. In some embodiments, the low clock signal CLKL may periodically transition between the high gate voltage VGH and the second low gate voltage VGL2. Further, the low clock signal CLKL may have an opposite phase to the inverted clock signal CLKb and the inverted low clock signal CLKLb. Thus, the low clock signal CLKL may be an inverted signal of the inverted low clock signal CLKLb.

Further, the output circuit 190 may output the high gate voltage VGH as the carry signal CR[n] in response to the bootstrapped voltage of the carry control node QC on which the bootstrapping operation may be performed, may output the second low gate voltage VGL2 as the carry signal CR[n] in response to the inverted low clock signal CLKLb, may output the high gate voltage VGH as the emission signal EM[n] in response to the bootstrapped voltage of the emission control node QE on which the bootstrapping operation may be performed, and may output the first low gate voltage VGL1 as the emission signal EM[n] in response to the charged voltage or the bootstrapped voltage of the carry control node QC.

In some embodiments, the output circuit 190 may further include an eleventh transistor T11 that outputs the low clock signal CLKL as the carry signal CR[n], a twelfth transistor T12 that outputs the second low gate voltage VGL2 as the carry signal CR[n], a thirteenth transistor T13 that outputs the high gate voltage VGH as the emission signal EM[n], and a fourteenth transistor T14 that outputs the first low gate voltage VGL1 as the emission signal EM[n]. For example, the eleventh transistor T11 may include a gate electrically connected to the carry control node QC, a first terminal receiving the low clock signal CLKL, and a second terminal electrically connected to the carry output node NCO, and the twelfth transistor T12 may include a gate receiving the inverted low clock signal CLKLb, a first terminal electrically connected to the carry output node NCO, and a second terminal electrically connected to the second low voltage line VSSL transferring the second low gate voltage VGL2. Further, for example, the thirteenth transistor T13 may include a gate electrically connected to the emission control node QE, a first terminal electrically connected to the high voltage line VDD transferring the high gate voltage VGH, and a second terminal electrically connected to an emission output node NEO at which the emission signal EM[n] may be output, and the fourteenth transistor T14 may include a gate electrically connected to the carry control node QC, a first terminal electrically connected to the emission output node NEO, and a second terminal electrically connected to a first low voltage line VSS transferring the first low gate voltage VGL1.

In a conventional emission driver, a transistor that outputs a carry signal having a low voltage may be turned on for most (e.g., about 99.8%) of a frame period, and thus a gate-source voltage stress may be continuously applied to the transistor. However, in the stage 100 of the emission driver according to embodiments, the twelfth transistor T12 that outputs the second low gate voltage VGL2 as the carry signal CR[n] may be turned on in response to the inverted low clock signal CLKLb having a duty ratio of about 50%. Thus, the twelfth transistor T12 may be repeatedly turned on and off in response to the inverted low clock signal CLKLb in each frame period. Accordingly, the twelfth transistor T12 may be turned on for about 50% of the frame period, and the time during which the gate-source voltage stress may be applied to the twelfth transistor T12 may be reduced.

Further, in the stage 100 of the emission driver according to embodiments, input signals (e.g., the low clock signal CLKL, the inverted low clock signal CLKLb, the previous carry signal CR[n−1] and the next carry signal CR[n+1]) may have, as a low voltage, the second low gate voltage VGL2 lower than the first low gate voltage VGL1 of the emission signal EM[n], and the carry control node QC and the emission control node QE may be discharged to the second low gate voltage VGL2 lower than the first low gate voltage VGL1. Accordingly, the emission driver may operate normally not only in a normal mode or an enhancement mode, but also in a depletion mode where each transistor T1 through T14 has a negative threshold voltage.

In some embodiments, as illustrated in FIG. 1, the transistors T1 through T14 of the stage 100 may be n-type metal oxide semiconductor (NMOS) transistors or oxide transistors. In other embodiments, some or all of the transistors T1 through T14 of the stage 100 may be implemented as p-type metal oxide semiconductor (PMOS) transistors.

As described above, in the stage 100 of the emission driver according to embodiments, the carry control node QC for outputting the carry signal CR[n] and the emission control node QE for outputting the emission signal EM[n] may be separated from each other. The second low gate voltage VGL2 that may be used as a low voltage of the input signals (e.g., CLKL, CLKLb, CR[n−1], CR[n+1]) and the carry and emission control nodes QC and QE may be lower than the first low gate voltage VGL1 that may be used as a low voltage of the emission signal EM[n]. Further, the transistors (e.g., T2, T3, T6, T7, T9 and T10) between each of the carry and emission control nodes QC and QE and the second low voltage line VSSL transferring the second low gate voltage VGL2 may have the STT structure. Further, the twelfth transistor T12 outputting the second low gate voltage VGL2 as the carry signal CR[n] may be repeatedly turned on and off in response to the inverted low clock signal CLKLb. Accordingly, operation reliability of the emission driver according to embodiments may be improved.

Figure 2:
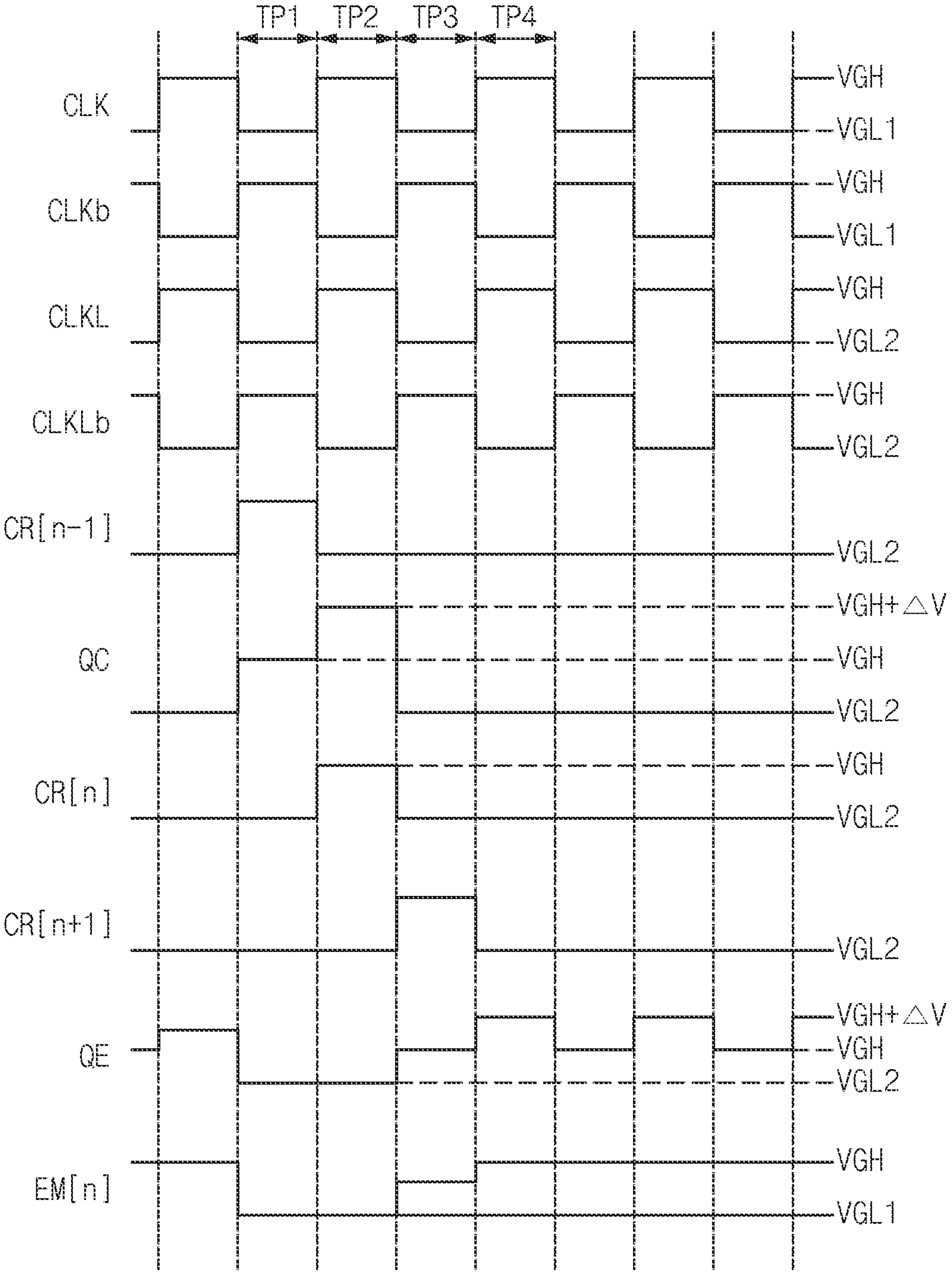
FIG. 2 is a timing diagram for describing an example of an operation of a stage of FIG. 1.
Figure 3:
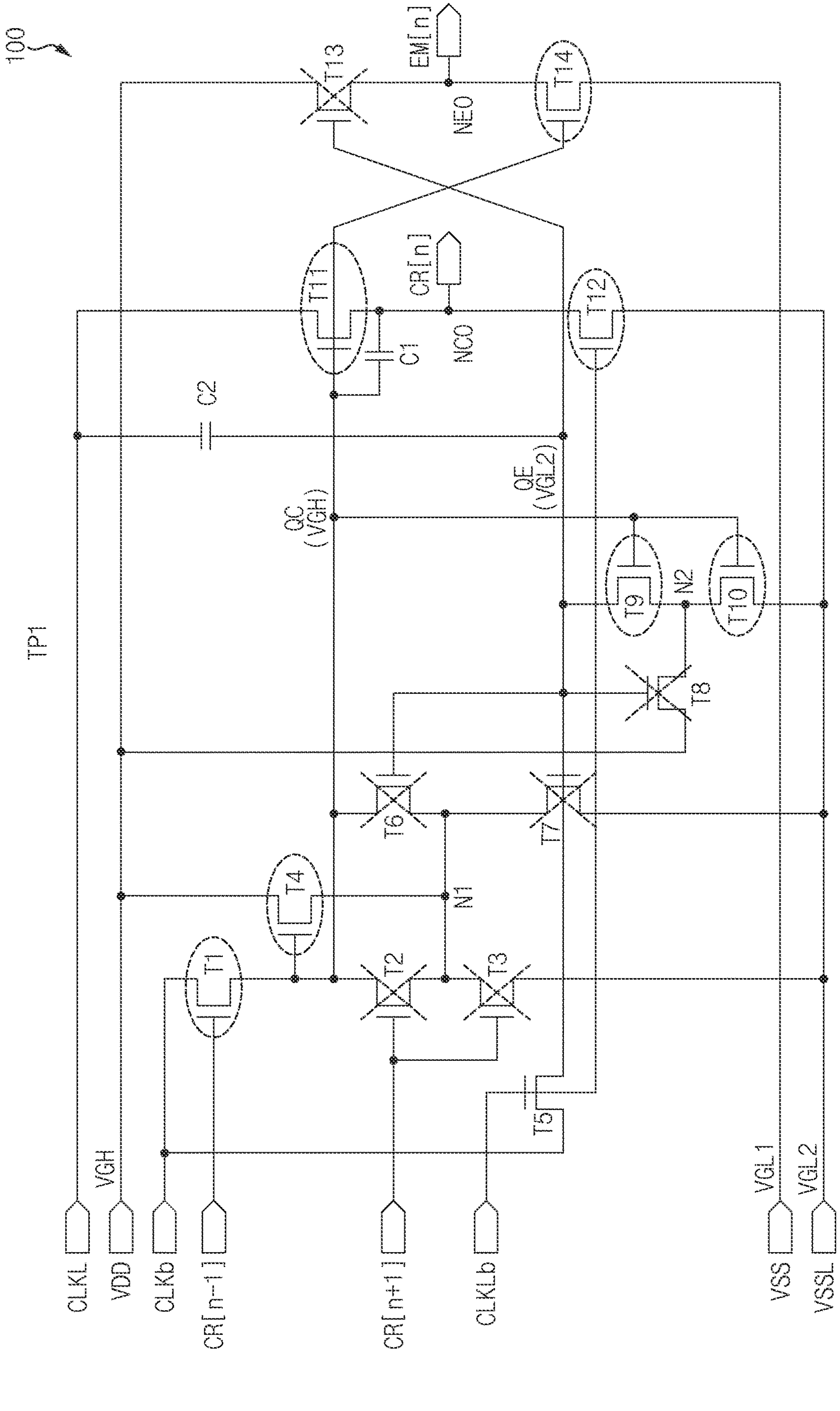
FIG. 3 is a schematic diagram of an equivalent circuit for describing an example of an operation of a stage of FIG. 1 at a first time period.
Figure 4:
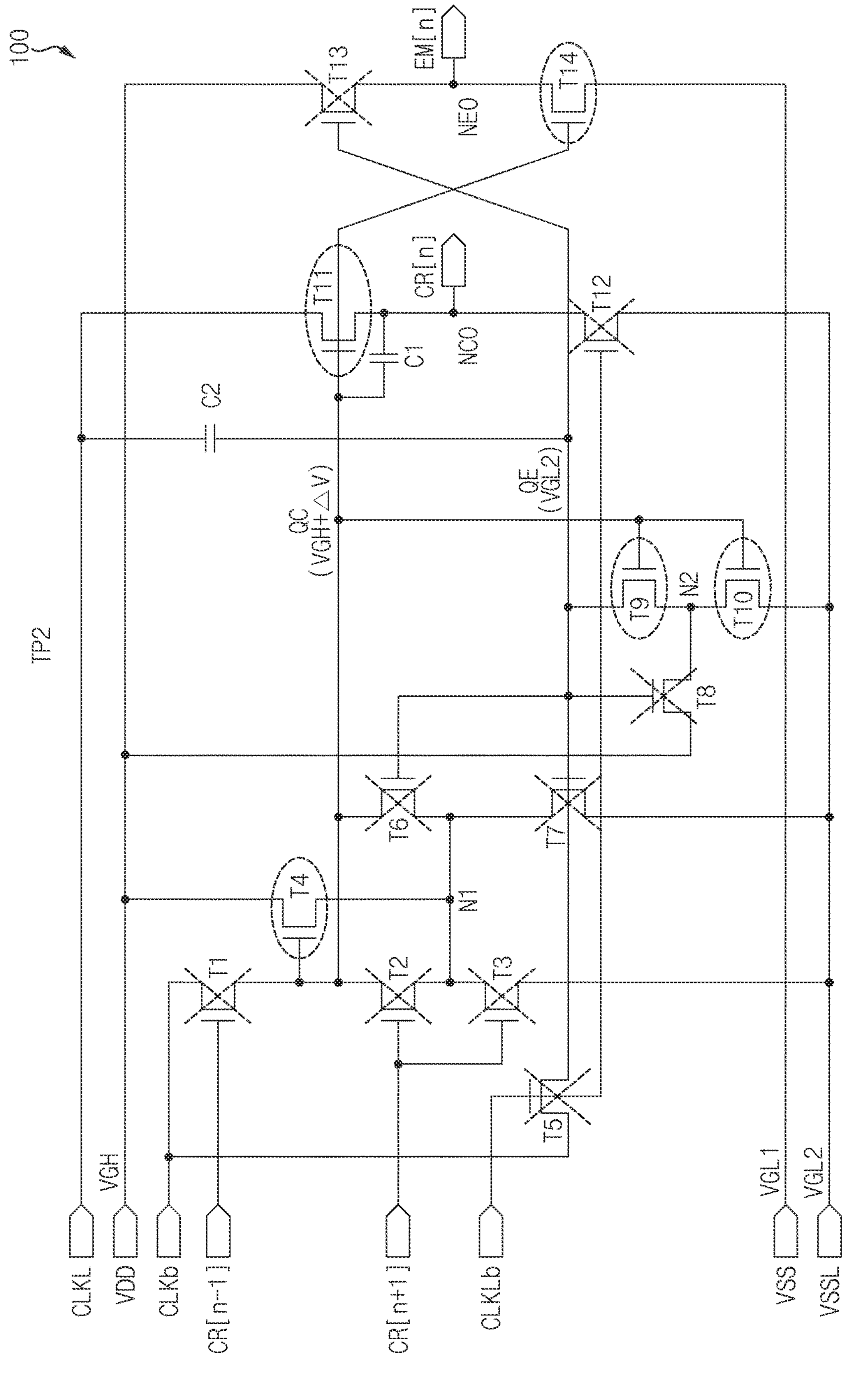
FIG. 4 is a schematic diagram of an equivalent circuit for describing an example of an operation of a stage of FIG. 1 at a second time period.
Figure 5:
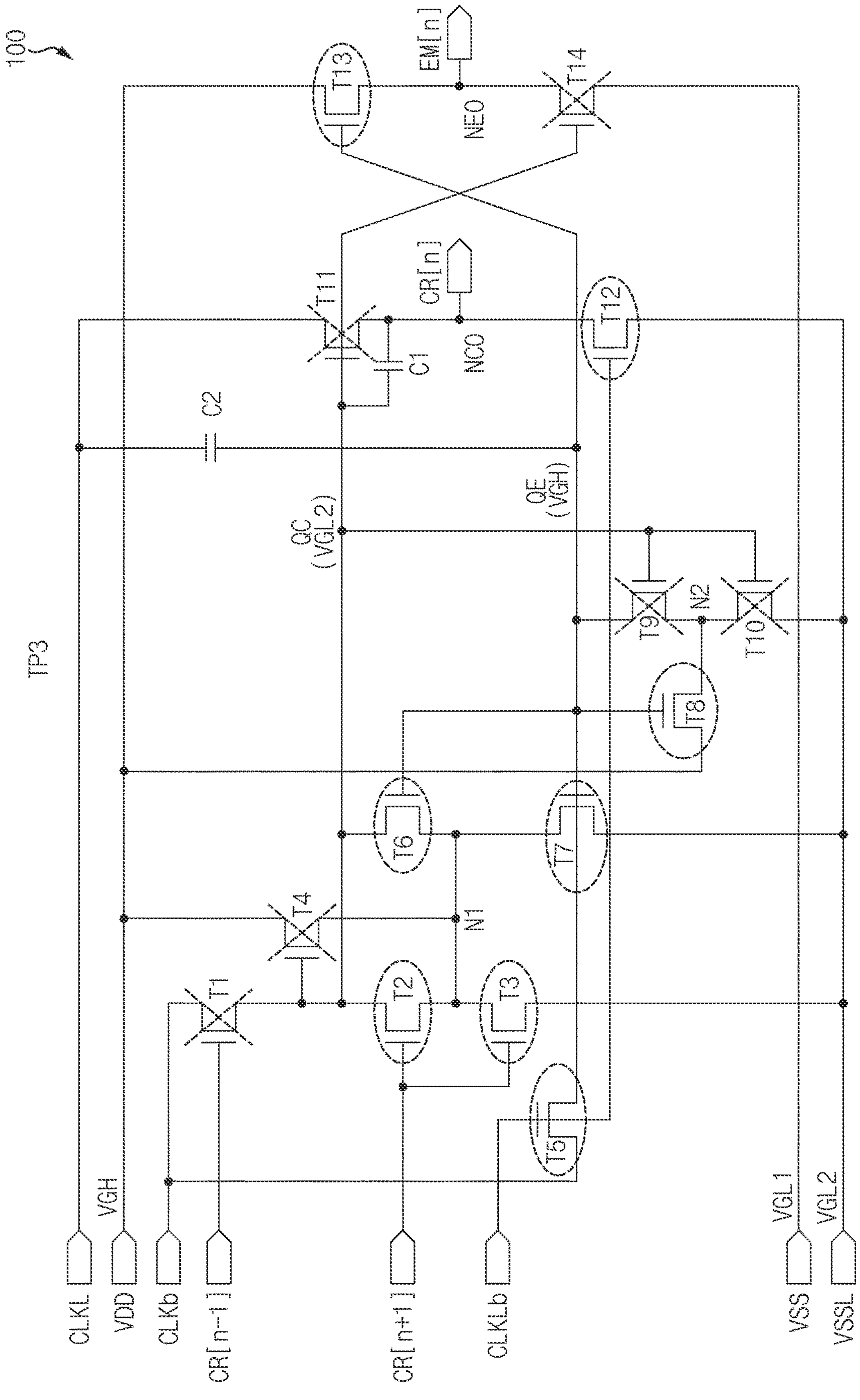
FIG. 5 is a schematic diagram of an equivalent circuit for describing an example of an operation of a stage of FIG. 1 at a third time period.
Figure 6:
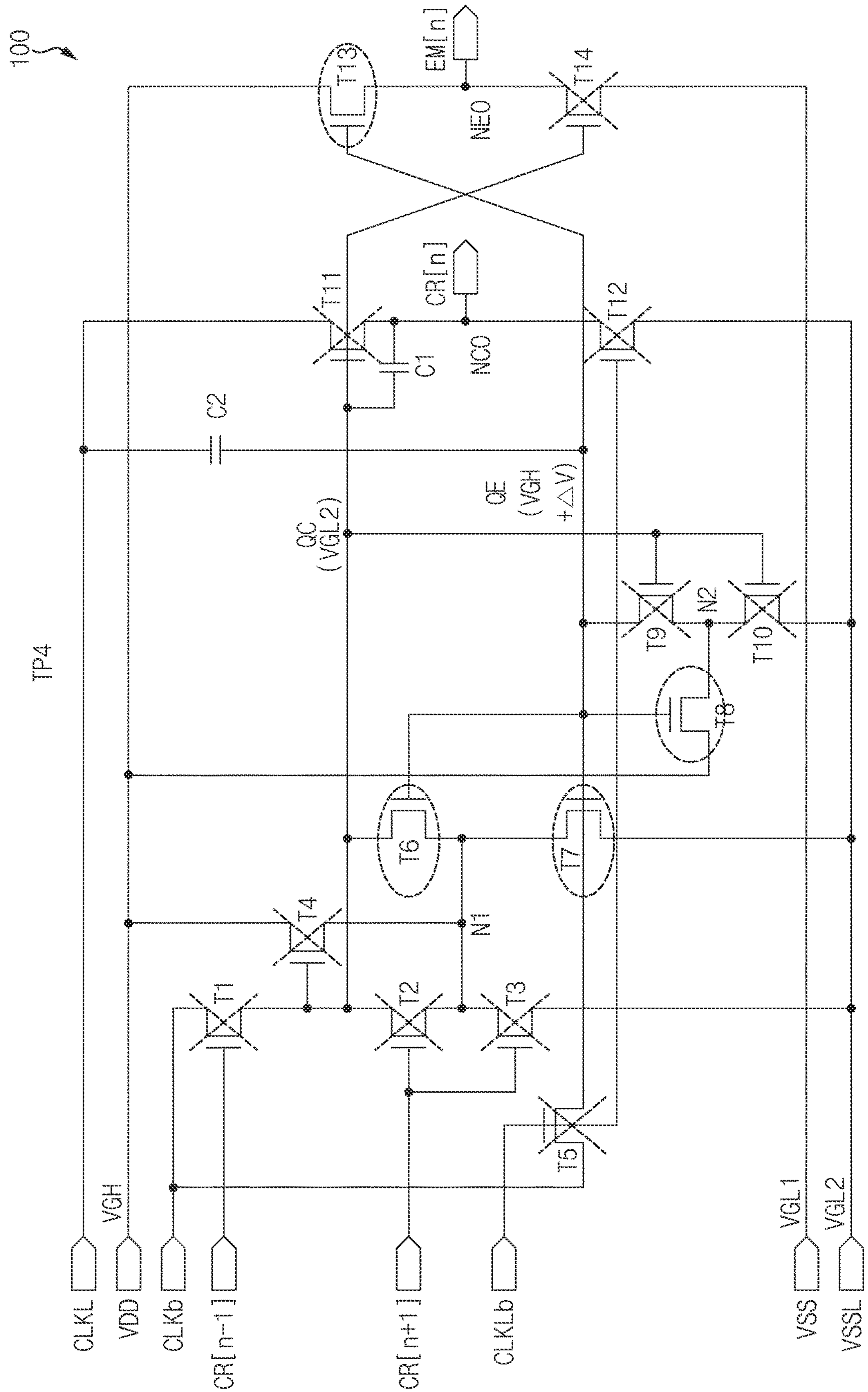
FIG. 6 is a schematic diagram of an equivalent circuit for describing an example of an operation of a stage of FIG. 1 at a fourth time period.

Hereinafter, an example of an operation of the stage 100 will be described with reference to FIGS. 1 through 6. FIG. 2 is a timing diagram for describing an example of an operation of a stage of FIG. 1, FIG. 3 is a schematic diagram of an equivalent circuit for describing an example of an operation of a stage of FIG. 1 at a first time period TP1, FIG. 4 is a schematic diagram of an equivalent circuit for describing an example of an operation of a stage of FIG. 1 at a second time period TP2, FIG. 5 is a schematic diagram of an equivalent circuit for describing an example of an operation of a stage of FIG. 1 at a third time period TP3, and FIG. 6 is a schematic diagram of an equivalent circuit for describing an example of an operation of a stage of FIG. 1 at a fourth time period TP4.

Referring to FIGS. 1 and 2, an emission driver including a stage 100 may receive a clock signal CLK, an inverted clock signal CLKb, a low clock signal CLKL and an inverted low clock signal CLKLb. In some embodiments, each of the clock signal CLK, the inverted clock signal CLKb, the low clock signal CLKL and the inverted low clock signal CLKLb may have a duty ratio of about 50%, but may not be limited thereto.

The clock signal CLK and the inverted clock signal CLKb may periodically transition between a high gate voltage VGH and a first low gate voltage VGL1, and may have phases opposite to each other. That is, the inverted clock signal CLKb may be an inverted signal of the clock signal CLK. In some embodiments, odd-numbered stages among multiple stages of the emission driver may operate in response to the inverted clock signal CLKb as illustrated in FIG. 1, and even-numbered stages among the multiple stages may operate in response to the clock signal CLK instead of the inverted clock signal CLKb.

The low clock signal CLKL and the inverted low clock signal CLKLb may periodically transition between the high gate voltage VGH and a second low gate voltage VGL2 lower than the first low gate voltage VGL1, and may have phases opposite to each other. That is, the inverted low clock signal CLKLb may be an inverted signal of the low clock signal CLKL. In some embodiments as illustrated in FIGS. 1 and 2, each of the odd-numbered stages may charge an emission control node QE in response to the inverted low clock signal CLKLb, and may perform a bootstrapping operation on the emission control node QE in response to the low clock signal CLKL. However, each of the even-numbered stages may charge the emission control node QE in response to the low clock signal CLKL instead of the inverted low clock signal CLKLb, and may perform the bootstrapping operation on the emission control node QE in response to the inverted low clock signal CLKLb instead of the low clock signal CLKL.

In a first time period TP1 as illustrated in FIGS. 2 and 3, a first transistor T1 may transfer the inverted clock signal CLKb having the high gate voltage VGH to a carry control node QC in response to a previous carry signal CR[n−1] having the high gate voltage VGH. Thus, the carry control node QC may be charged to the high gate voltage VGH (or a voltage obtained by subtracting a threshold voltage of the first transistor T1 from the high gate voltage VGH). Second and third transistors T2 and T3 may be turned off in response to a next carry signal CR[n+1] having the second low gate voltage VGL2. A fourth transistor T4 may transfer the high gate voltage VGH to a first intermediate node N1 in response to the high gate voltage VGH of the carry control node QC. Ninth and tenth transistors T9 and T10 may transfer the second low gate voltage VGL2 to the emission control node QE in response to the high gate voltage VGH of the carry control node QC. Thus, the emission control node QE may be discharged to the second low gate voltage VGL2. In some embodiments, the ninth and tenth transistors T9 and T10 may have a size (or a channel width) (e.g., about four times or about five times) larger than that of a fifth transistor T5. Therefore, even if the fifth transistor T5 may be turned on in response to the inverted low clock signal CLKLb having the high gate voltage VGH, the emission control node QE may be discharged to the second low gate voltage VGL2. Sixth, seventh and eighth transistors T6, T7 and T8 may be turned off in response to the second low gate voltage VGL2 of the emission control node QE.

Further, in the first time period TP1, an eleventh transistor T11 may transfer the second low gate voltage VGL2 to a carry output node NCO in response to the high gate voltage VGH of the carry control node QC, a twelfth transistor T12 may transfer the second low gate voltage VGL2 of a second low voltage line VSSL to the carry output node NCO in response to the inverted low clock signal CLKLb having the high gate voltage VGH, and thus the second low gate voltage VGL2 may be output as a carry signal CR[n] at the carry output node NCO. Further, a thirteenth transistor T13 may be turned off in response to the second low gate voltage VGL2 of the emission control node QE, a fourteenth transistor T14 may transfer the first low gate voltage VGL1 of a first low voltage line VSS to the emission output node NEO in response to the high gate voltage VGH of the carry control node QC, and thus the first low gate voltage VGL1 may be output as an emission signal EM[n] at the emission output node NEO.

In a second time period TP2, as illustrated in FIGS. 2 and 4, the first transistor T1 may be turned off in response to the previous carry signal CR[n−1] having the second low gate voltage VGL2, the second and third transistors T2 and T3 may be turned off in response to the next carry signal CR[n+1] having the second low gate voltage VGL2, the sixth and seventh transistors T6 and T7 may be turned off in response to the second low gate voltage VGL2 of the emission control node QE, and thus the carry control node QC may be in a floating state. Further, the low clock signal CLKL transferred to the carry output node NCO by the eleventh transistor T11 may be changed from the second low gate voltage VGL2 to the high gate voltage VGH in the second time period TP2. Accordingly, if a voltage of the carry output node NCO electrically connected to a second electrode of a first capacitor C1 may be changed from the second low gate voltage VGL2 to the high gate voltage VGH by a coupling effect of the first capacitor C1, a voltage of the carry control node QC electrically connected to a first electrode of the first capacitor C1 may be boosted or bootstrapped from the high gate voltage VGH to a voltage VGH+ΔV higher than the high gate voltage VGH. This operation may be referred to as a bootstrapping operation for the carry control node QC. The fourth transistor T4 may transfer the high gate voltage VGH to the first intermediate node N1 in response to the bootstrapped voltage VGH+ΔV of the carry control node QC. Accordingly, even if the voltage of the carry control node QC is bootstrapped, a drain-source voltage stress may be distributed among the second transistor T2 and the third transistor T3, and may be distributed among the sixth transistor T6 and the seventh transistor T7. The fifth transistor T5 may be turned off in response to the inverted low clock signal CLKLb having the second low gate voltage VGL2, the ninth and tenth transistors T9 and T10 may transfer the second low gate voltage VGL2 to the emission control node QE in response to the bootstrapped voltage VGH+ΔV of the carry control node QC, and thus the emission control node QE may have the second low gate voltage VGL2. The eighth transistor T8 may be turned off in response to the second low gate voltage VGL2 of the emission control node QE.

Further, in the second time period TP2, the eleventh transistor T11 may transfer the low clock signal CLKL having the high gate voltage VGH to the carry output node NCO in response to the bootstrapped voltage VGH+ΔV of the carry control node QC, the twelfth transistor T12 may be turned off in response to the inverted low clock signal CLKLb having the second low gate voltage VGL2, and thus the high gate voltage VGH may be output as the carry signal CR[n] at the carry output node NCO. Further, the thirteenth transistor T13 may be turned off in response to the second low gate voltage VGL2 of the emission control node QE, the fourteenth transistor T14 may transfer the first low gate voltage VGL1 of the first low voltage line VSS to the emission output node NEO in response to the bootstrapped voltage VGH+ΔV of the carry control node QC, and thus the first low gate voltage VGL1 may be output as the emission signal EM[n] at the emission output node NEO. In some embodiments, the first and second time periods TP1 and TP2 in which the first low gate voltage VGL1 may be output as the emission signal EM[n] may correspond to a non-emission period of a frame period.

In a third time period TP3, as illustrated in FIGS. 2 and 5, the fifth transistor T5 may transfer the inverted clock signal CLKb having the high gate voltage VGH to the emission control node QE in response to the inverted low clock signal CLKLb having the high gate voltage VGH. Thus, the emission control node QE may be charged to the high gate voltage VGH (or a voltage obtained by subtracting a threshold voltage of the fifth transistor T5 from the high gate voltage VGH). Further, the first transistor T1 may be turned off in response to the previous carry signal CR[n−1] having the second low gate voltage VGL2, the second and third transistors T2 and T3 may transfer the second low gate voltage VGL2 to the carry control node QC in response to the next carry signal CR[n+1] having the high gate voltage VGH, the sixth and seventh transistors T6 and T7 may transfer the second low gate voltage VGL2 to the carry control node QC in response to the high gate voltage VGH of the emission control node QE, and thus the carry control node QC may be discharged to the second low gate voltage VGL2. Further, the fourth, ninth and tenth transistors T4, T9 and T10 may be turned off in response to the second low gate voltage VGL2 of the carry control node QC, and the eighth transistor T8 may transfer the high gate voltage VGH to a second intermediate node N2 in response to the high gate voltage VGH of the emission control node QE.

Further, in the third time period TP3, the eleventh transistor T11 may be turned off in response to the second low gate voltage VGL2 of the carry control node QC, the twelfth transistor T12 may transfer the second low gate voltage VGL2 of the second low voltage line VSSL to the carry output node NCO in response to the inverted low clock signal CLKLb having the high gate voltage VGH, and thus the second low gate voltage VGL2 may be output as the carry signal CR[n] at the carry output node NCO. Further, the thirteenth transistor T13 may transfer the high gate voltage VGH of a high voltage line VDD to the emission output node NEO in response to the high gate voltage VGH of the emission control node QE, the fourteenth transistor T14 may be turned off in response to the second low gate voltage VGL2 of the carry control node QC, and thus the high gate voltage VGH (or a voltage obtained by subtracting a threshold voltage of the thirteenth transistor T13 from the high gate voltage VGH) may be output as the emission signal EM[n] at the emission output node NEO.

In a fourth time period TP4, as illustrated in FIGS. 2 and 6, the fifth transistor T5 may be turned off in response to the inverted low clock signal CLKLb having the second low gate voltage VGL2, the ninth and tenth transistors T9 and T10 may be turned off in response to the second low gate voltage VGL2 of the carry control node QC, and thus the emission control node QE may be in a floating state. Further, the low clock signal CLKL applied to a first electrode of a second capacitor C2 may be changed from the second low gate voltage VGL2 to the high gate voltage VGH in the fourth time period TP4. Accordingly, by a coupling effect of the second capacitor C2, a voltage of the emission control node QE electrically connected to a second electrode of the second capacitor C2 may be boosted or bootstrapped from the high gate voltage VGH to a voltage VGH+ΔV higher than the high gate voltage VGH. This operation may be referred to as a bootstrapping operation for the emission control node QE. The first transistor T1 may be turned off in response to the previous carry signal CR[n−1] having the second low gate voltage VGL2, the second and third transistors T2 and T3 may be turned off in response to the next carry signal CR[n+1] having the second low gate voltage VGL2, the fourth transistor T4 may be turned off in response to the second low gate voltage VGL2 of the carry control node QC, the sixth and seventh transistors T6 and T7 may transfer the second low gate voltage VGL2 to the carry control node QC in response to the bootstrapped voltage VGH+ΔV of the emission control node QE, and thus the carry control node QC may have the second low gate voltage VGL2. Further, the eighth transistor T8 may transfer the high gate voltage VGH to the second intermediate node N2 in response to the bootstrapped voltage VGH+ΔV of the emission control node QE. Accordingly, even if the voltage of the emission control node QE is bootstrapped, a drain-source voltage stress may be distributed among the ninth transistor T9 and the tenth transistor T10.

Further, in the fourth time period TP4, the eleventh transistor T11 may be turned off in response to the second low gate voltage VGL2 of the carry control node QC, and the twelfth transistor T12 may be turned off in response to the inverted low clock signal CLKLb having the second low gate voltage VGL2. In the fourth time period TP4, although the twelfth transistor T12 may be turned off, no leakage current may be applied to the carry output node NCO, and thus the carry signal CR[n] may be maintained as the second low gate voltage VGL2. Further, the thirteenth transistor T13 may transfer the high gate voltage VGH of the high voltage line VDD to the emission output node NEO in response to the bootstrapped voltage VGH+ΔV of the emission control node QE, the fourteenth transistor T14 may be turned off in response to the second low gate voltage VGL2 of the carry control node QC, and thus the high gate voltage VGH may be output as the emission signal EM[n] at the emission output node NEO. The thirteenth transistor T13 may be fully turned on in response to the bootstrapped voltage VGH+ΔV of the emission control node QE, and thus the emission signal EM[n] may be substantially the same as the high gate voltage VGH.

The third and fourth time periods TP3 and TP4 in which the high gate voltage VGH may be output as the emission signal EM[n] may correspond to an emission period of the frame period. Further, as illustrated in FIG. 2, the third and fourth time periods TP3 and TP4 may be repeated for a time other than immediately following the first and second time periods TP1 and TP2. In a conventional emission driver, a transistor outputting a carry signal having a low voltage may be continuously turned on during the emission period. However, in the emission driver according to the embodiments, the twelfth transistor T12 outputting the second low gate voltage VGL2 as the carry signal CR[n] may be turned on in the third time period TP3, but may be turned off in the fourth time period TP4. Accordingly, a time during which a gate-source voltage stress is applied to the twelfth transistor T12 may be reduced.

Figure 7:
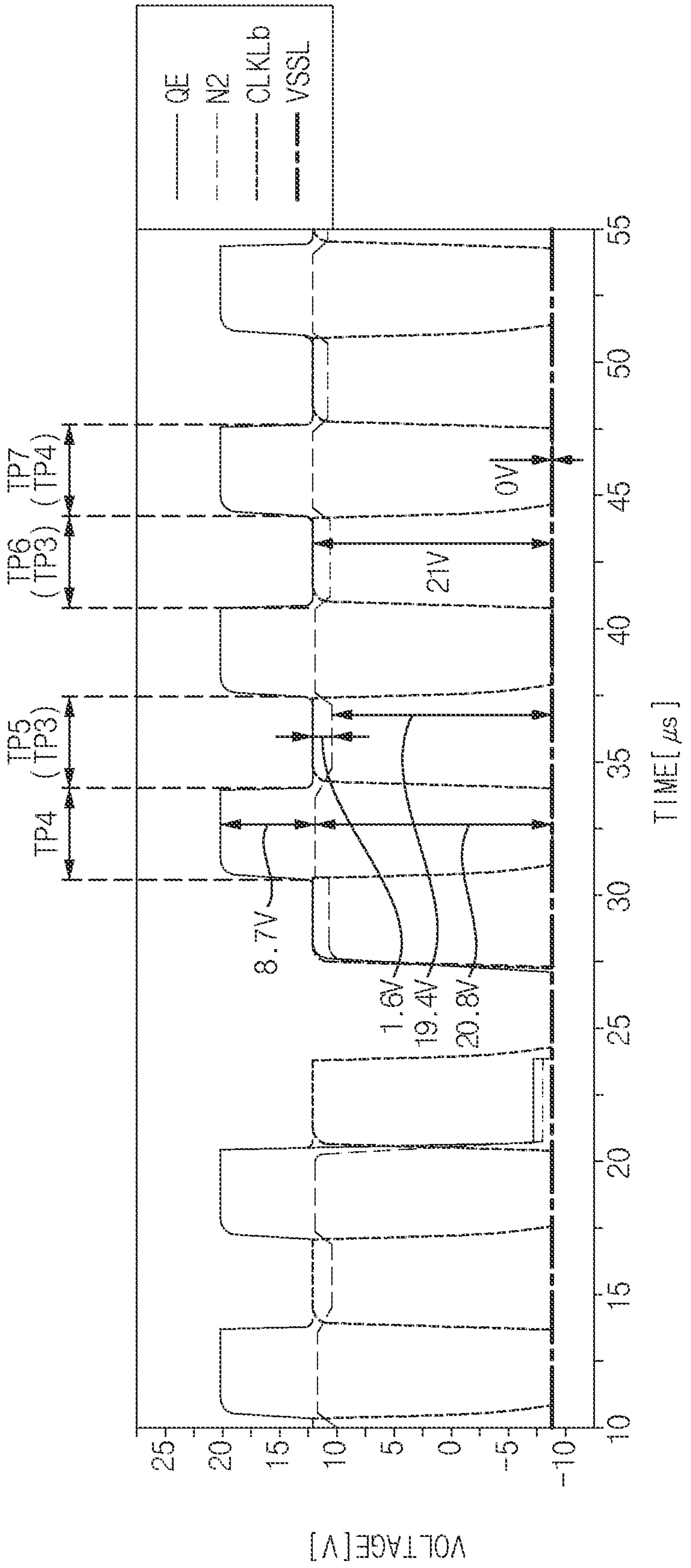
FIG. 7 is a timing diagram for describing an example of a drain-source voltage stress applied to ninth and tenth transistors in a stage of FIG. 1, and an example of a gate-source voltage stress applied to a twelfth transistor in a stage of FIG. 1.

FIG. 7 is a timing diagram for describing an example of a drain-source voltage stress applied to ninth and tenth transistors in a stage of FIG. 1, and an example of a gate-source voltage stress applied to a twelfth transistor in a stage of FIG. 1. Referring to FIGS. 1 and 7, in a fourth time period TP4 in which a voltage of an emission control node QE may be bootstrapped, a voltage difference between a bootstrapped voltage of the emission control node QE and a second low gate voltage VGL2, or a drain-source voltage stress may be distributed among a ninth transistor T9 and a tenth transistor T10. For example, in the fourth time period TP4, as illustrated in FIG. 7, a drain-source voltage of about 8.7V may be applied to the ninth transistor T9, and a drain-source voltage of about 20.8V may be applied to the tenth transistor T10. Further, in a fifth time period TP5 corresponding to a third time period TP3, a drain-source voltage of about 1.6V may be applied to the ninth transistor T9, and a drain-source voltage of about 19.4V may be applied to the tenth transistor T10.

Further, in an emission driver according to embodiments, a time during which a gate-source voltage stress may be applied to a twelfth transistor T12 may be reduced. For example, as illustrated in FIG. 7, a gate-source voltage of about 21V may be applied to the twelfth transistor T12 in a sixth time period TP6 corresponding to the third time period TP3, but a gate-source voltage of about 0V may be applied to the twelfth transistor T12 in a seventh time period TP7 corresponding to the fourth time period TP4. That is, the gate-source voltage stress may not be applied to the twelfth transistor T12 for a time corresponding to the fourth time period TP4.

Figure 8:
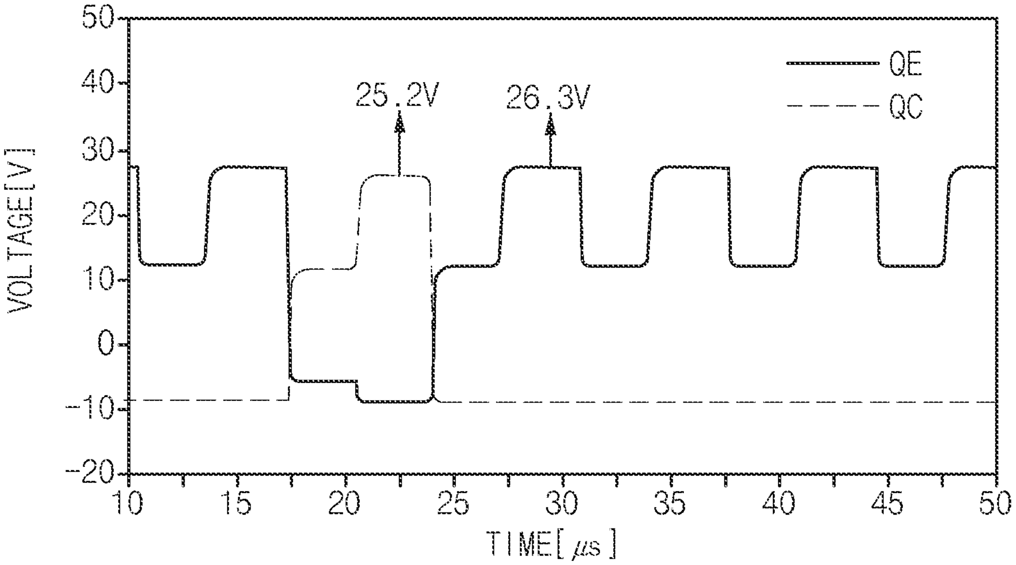
FIG. 8 is a timing diagram illustrating an example of voltages of a carry control node and an emission control node on which a bootstrapping operation is performed in a stage of FIG. 1.

FIG. 8 is a timing diagram illustrating an example of voltages of a carry control node and an emission control node on which a bootstrapping operation may be performed in a stage of FIG. 1. Referring to FIGS. 1 and 8, a voltage of a carry control node QC on which a bootstrapping operation may be performed may be boosted from a gate high voltage VGH of about 12V to about 25.2V, and a voltage of an emission control node QE on which a bootstrapping operation may be performed may be boosted from the gate high voltage VGH of about 12V to about 26.3V. Thus, in a stage 100 of an emission driver according to embodiments, the bootstrapping operations for the carry control node QC and the emission control node QE may be normally performed.

Figure 9:
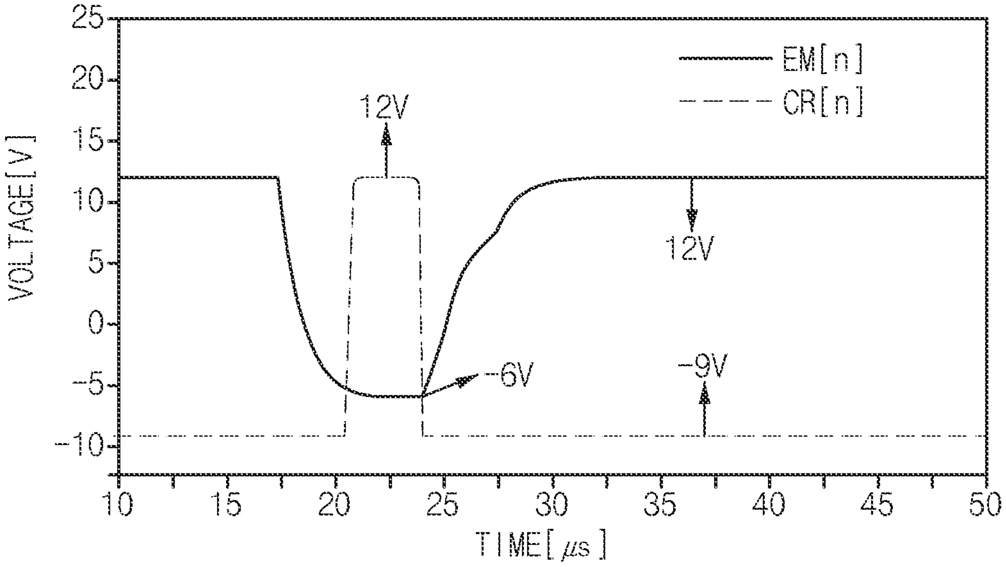
FIG. 9 is a timing diagram illustrating an example of a carry signal and an emission signal that are output by a stage of FIG. 1.

FIG. 9 is a timing diagram illustrating an example of a carry signal and an emission signal that are output by a stage of FIG. 1. Referring to FIGS. 1 and 9, in a stage 100 of an emission driver according to embodiments, a carry signal CR[n] having a second low gate voltage VGL2 of about −9V and a high gate voltage VGH of about 12V may be normally output, and an emission signal EM[n] having a first low gate voltage VGL1 of about −6V and the high gate voltage VGH of about 12V may be normally output.

Figure 10:
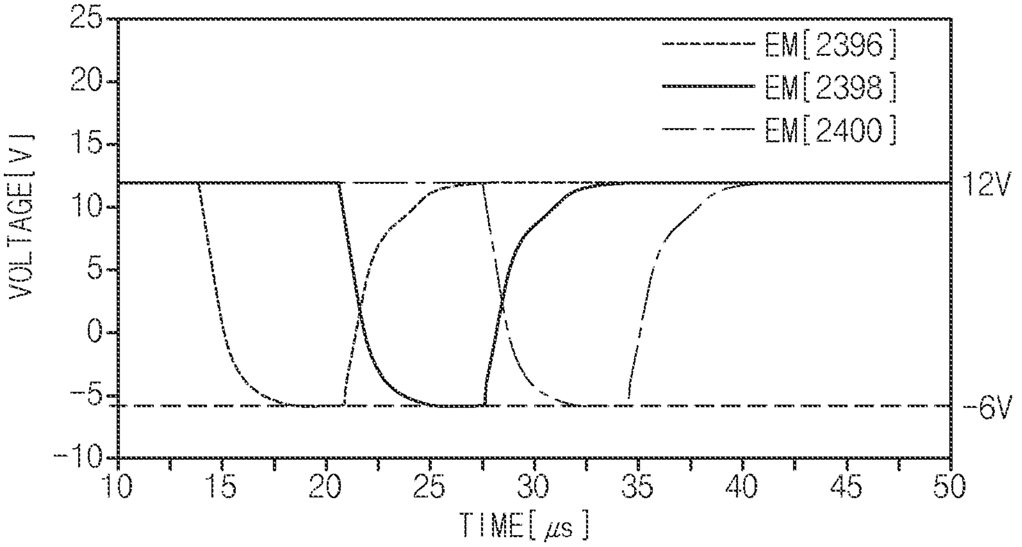
FIG. 10 is a timing diagram illustrating an example of emission signals that are output by an emission driver where each stage includes transistors operating in a depletion mode.

FIG. 10 is a timing diagram illustrating an example of emission signals that are output by an emission driver where each stage includes transistors operating in a depletion mode. FIG. 10 illustrates an example of a 2396th emission signal EM[2396], a 2398th emission signal EM[2398] and a 2400th emission signal EM[2400] of an emission driver that operates in a depletion mode in which each transistor T1 through T14 of each stage 100 have a threshold voltage of about −2V. Referring to FIGS. 1 and 10, even if each stage 100 operates in the depletion mode, the emission driver according to embodiments may normally output the emission signals EM[2396], EM[2398] and EM[2400].

Figure 11:
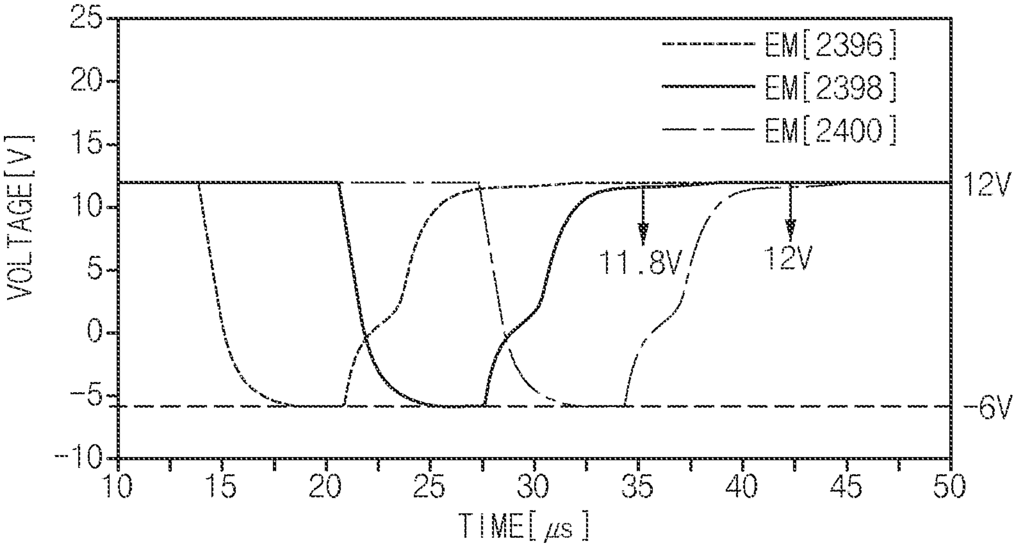
FIG. 11 is a timing diagram illustrating an example of emission signals that are output by an emission driver where each stage includes transistors operating in an enhancement mode.

FIG. 11 is a timing diagram illustrating an example of emission signals that are output by an emission driver where each stage includes transistors operating in an enhancement mode. FIG. 11 illustrates an example of a 2396th emission signal EM[2396], a 2398th emission signal EM[2398] and a 2400th emission signal EM[2400] of an emission driver that operates in an enhancement mode in which each transistor T1 through T14 of each stage 100 have a threshold voltage of about 4V. Referring to FIGS. 1 and 11, even if each stage 100 operates in the enhancement mode, the emission driver according to embodiments may normally output the emission signals EM[2396], EM[2398] and EM[2400].

Figure 12:
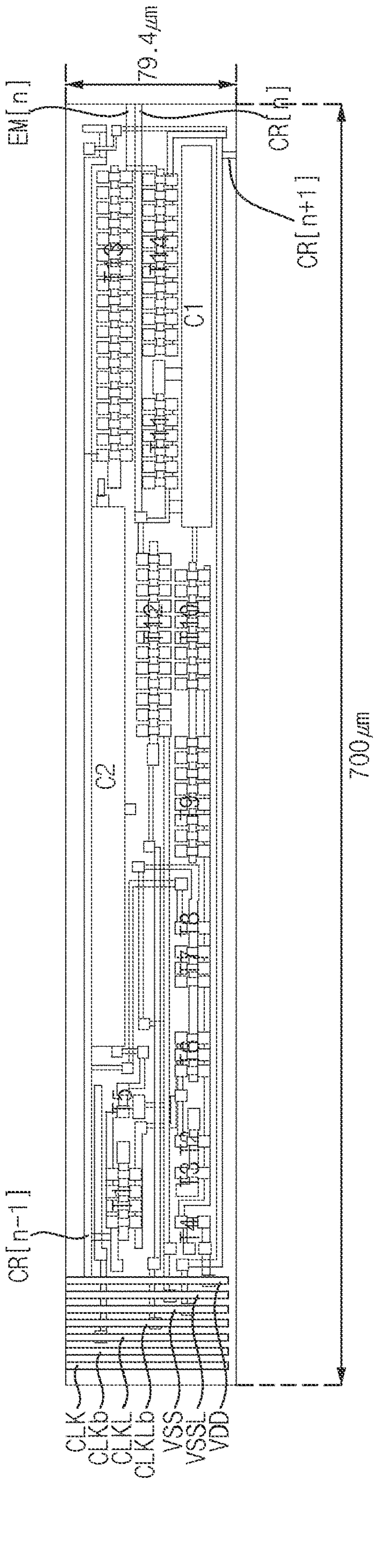
FIG. 12 is a schematic diagram illustrating an example of a layout of a stage of FIG. 1.

FIG. 12 is a schematic diagram illustrating an example of a layout of a stage of FIG. 1. Referring to FIGS. 1 and 12, a stage 100 may include fourteen transistors T1 through T14 and two capacitors C1 and C2, and may be implemented within a region having a length (e.g., a width) of about 700 μm in a long axis direction and a length (e.g., a height) of about 79.4 μm in a short axis direction. Thus, the stage 100 of an emission driver according to embodiments may have a small size.

Figure 13:
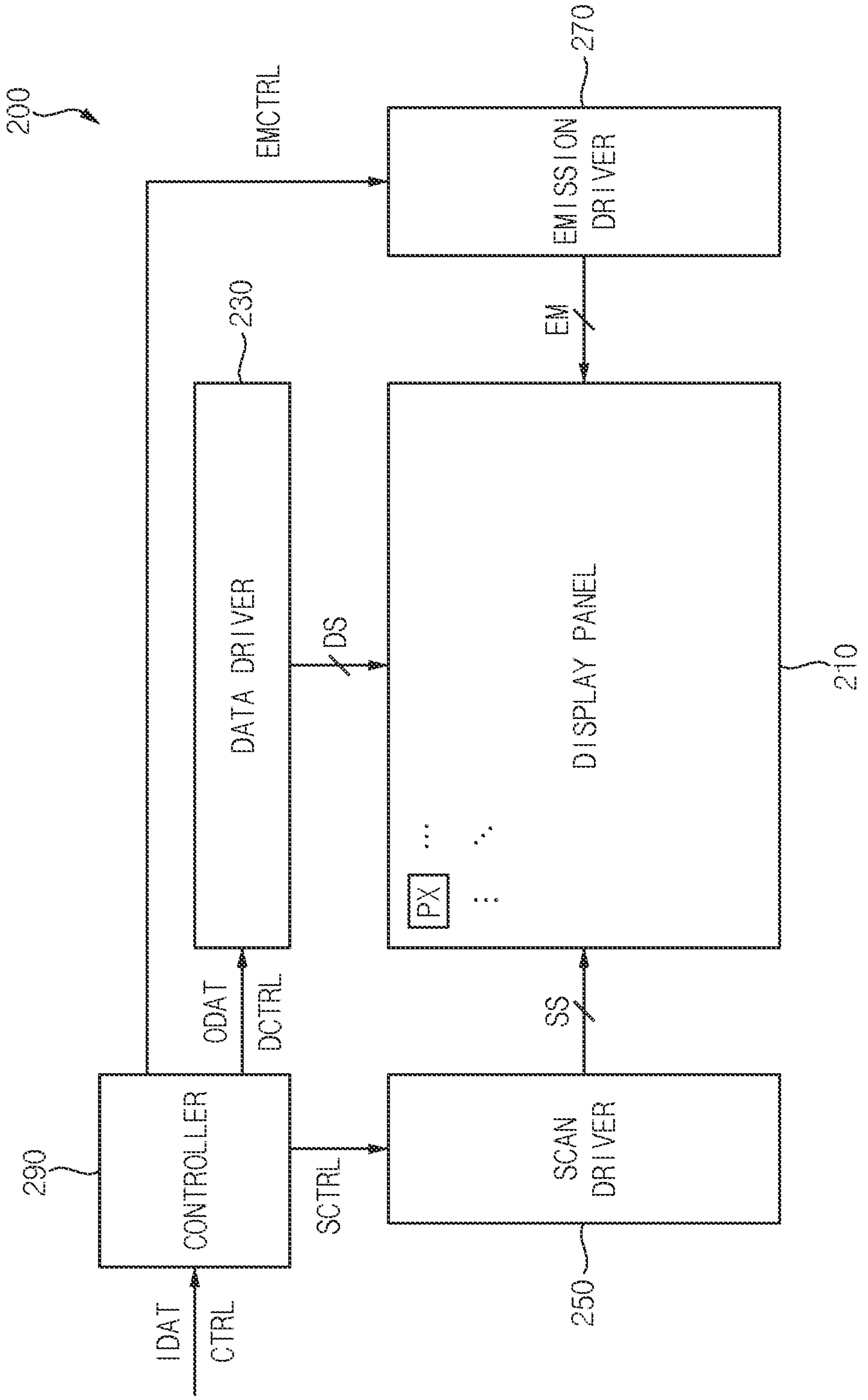
FIG. 13 is a block diagram illustrating a display device including an emission driver according to embodiments.
Figure 14:
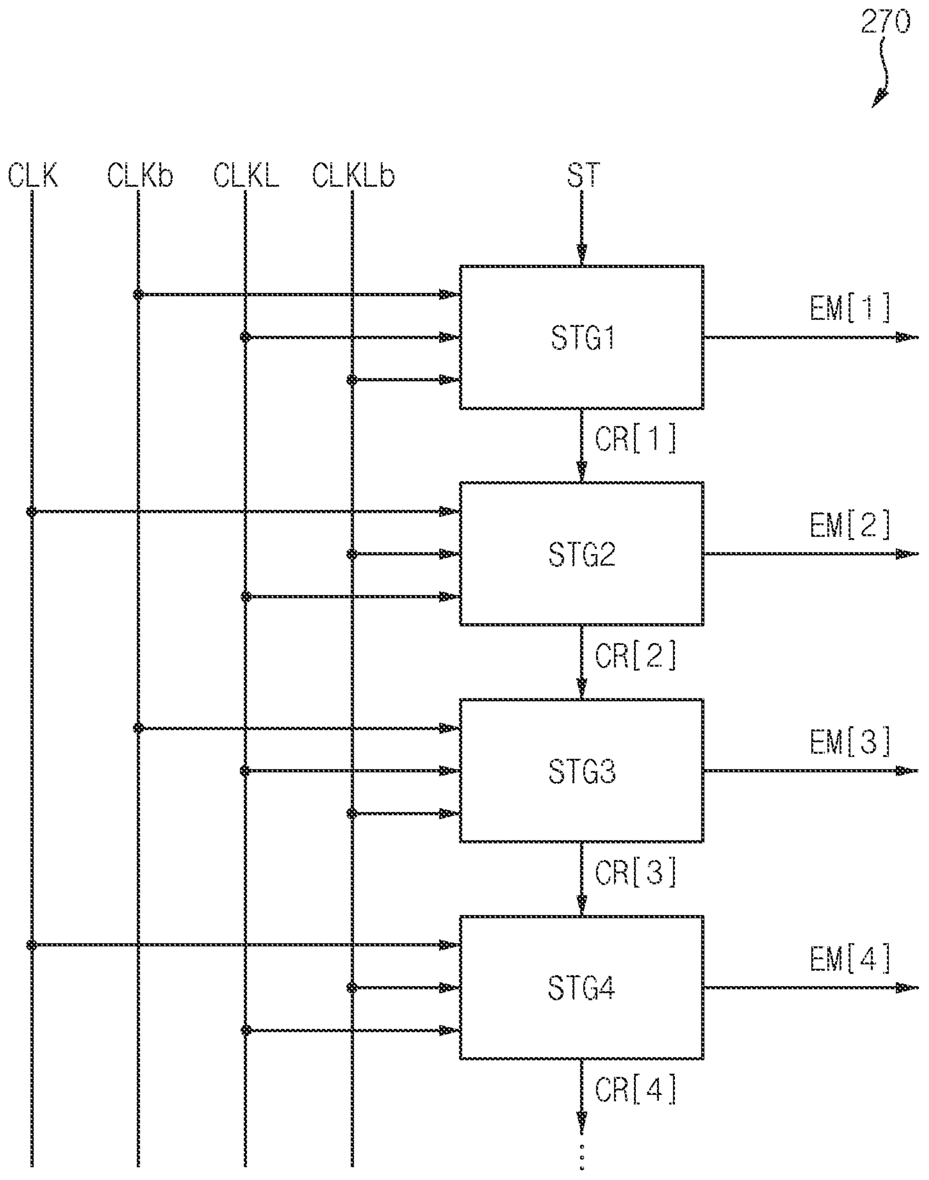
FIG. 14 is a block diagram illustrating an emission driver according to embodiments.
Figure 15:
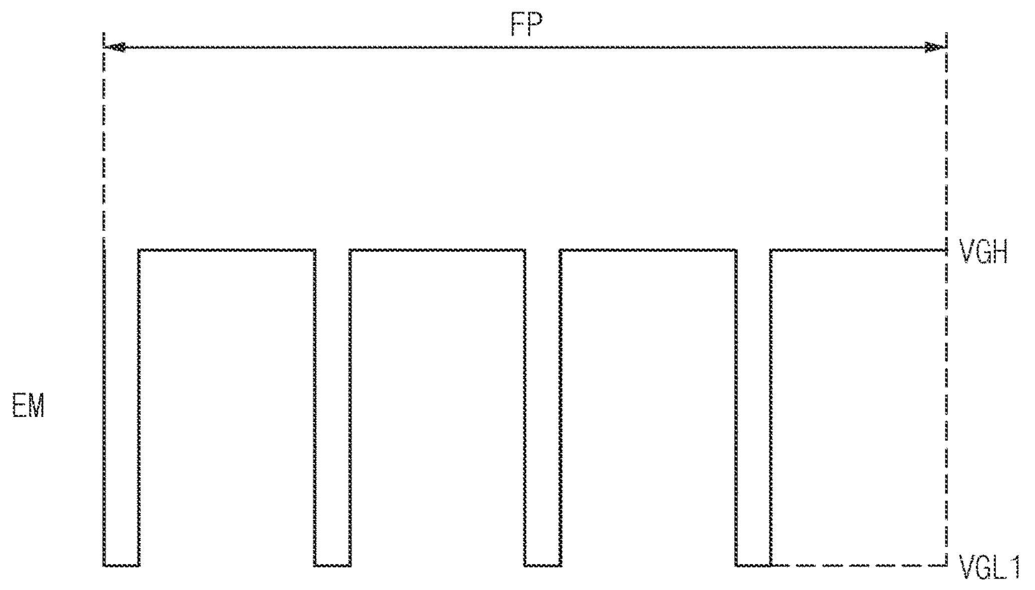
FIG. 15 is a timing diagram illustrating an example of an emission signal that is output by a stage of an emission driver according to embodiments.

FIG. 13 is a block diagram illustrating a display device including an emission driver according to embodiments, FIG. 14 is a block diagram illustrating an emission driver according to embodiments, and FIG. 15 is a timing diagram illustrating an example of an emission signal that may be output by a stage of an emission driver according to embodiments.

Referring to FIG. 13, a display device 200 according to embodiments may include a display panel 210 that includes multiple pixels PX, a data driver 230 that provides data signals DS to the multiple pixels PX, a scan driver 250 that provides scan signals SS to the multiple pixels PX, an emission driver 270 that provides emission signals EM to the multiple pixels PX, and a controller 290 that controls the data driver 230, the scan driver 250 and the emission driver 270.

The display panel 210 may include data lines, scan lines, emission lines and the multiple pixels PX electrically connected thereto. Each pixel PX may include a light emitting element that emits light. In some embodiments, the light emitting element may be an organic light emitting diode (OLED). In other embodiments, the light emitting element may be a nano light emitting diode (NED), a quantum dot (QD) light emitting diode, a micro light emitting diode, an inorganic light emitting diode, or any other suitable light emitting element. Further, each pixel PX may further include transistors (e.g., oxide transistors or NMOS transistors) for driving the light emitting element.

The data driver 230 may generate the data signals DS based on output image data ODAT and a data control signal DCTRL received from the controller 290, and may provide the data signals DS to the multiple pixels PX through the data lines. In some embodiments, the data control signal DCTRL may include, but not limited to, an output data enable signal, a horizontal start signal and a load signal. In some embodiments, the data driver 230 and the controller 290 may be implemented with a single integrated circuit, and the single integrated circuit may be referred to as a timing controller embedded data driver (TED). In other embodiments, the data driver 230 and the controller 290 may be implemented with separate integrated circuits.

The scan driver 250 may generate the scan signals SS based on a scan control signal SCTRL received from the controller 290, and may provide the scan signals SS to the multiple pixels PX through the scan lines. In some embodiments, the scan control signal SCTRL may include, but not limited to, a scan start signal and a scan clock signal. In some embodiments, the scan driver 250 may be integrated or formed in the display panel 210. In other embodiments, the scan driver 250 may be implemented with one or more integrated circuits.

The emission driver 270 may generate the emission signals EM based on an emission control signal EMCTRL received from the controller 290, and may provide the emission signals EM to the multiple pixels PX through the emission lines. In some embodiments, the emission control signal EMCTRL may include, but not limited to, a start signal, a clock signal, an inverted clock signal, a low clock signal and an inverted low clock signal. In some embodiments, the emission driver 270 may be integrated or formed in the display panel 210. In other embodiments, the emission driver 270 may be implemented with one or more integrated circuits.

As shown in FIG. 14, the emission driver 270 may include multiple stages STG1, STG2, STG3, STG4, . . . that receive the start signal ST, the clock signal CLK, the inverted clock signal CLKb, the low clock signal CLKL and the inverted low clock signal CLKLb, and that sequentially outputs the emission signals EM[1], EM[2], EM[3], EM[4], . . . to the multiple pixels PX on a row basis. In some embodiments, odd-numbered stages STG1, STG3, . . . may receive the inverted clock signal CLKb, the low clock signal CLKL and the inverted low clock signal CLKLb, and may operate in response to the inverted clock signal CLKb, the low clock signal CLKL and the inverted low clock signal CLKLb. However, even-numbered stages STG2, STG4, . . . may receive the clock signal CLK instead of the inverted clock signal CLKb, may receive the inverted low clock signal CLKLb instead of the low clock signal CLKL, may receive the low clock signal CLKL instead of the inverted low clock signal CLKLb, and may operate in response to the clock signal CLK, the inverted low clock signal CLKLb and the low clock signal CLKL.

For example, a first stage STG1 may output a first carry signal CR[1] by charging a carry control node based on the start signal ST and the inverted clock signal CLKb and by performing a bootstrapping operation on the carry control node based on the low clock signal CLKL, and may output a first emission signal EM[1] by charging an emission control node based on the inverted low clock signal CLKLb and the inverted clock signal CLKb and by performing a bootstrapping operation on the emission control node based on the low clock signal CLKL. Further, a second stage STG2 may output a second carry signal CR[2] by charging a carry control node based on the first carry signal CR[1] and the clock signal CLK and by performing a bootstrapping operation on the carry control node based on the inverted low clock signal CLKLb, and may output a second emission signal EM[2] by charging an emission control node based on the low clock signal CLKL and the clock signal CLK and by performing a bootstrapping operation on the emission control node based on the inverted low clock signal CLKLb. Further, a third stage STG3 may output a third carry signal CR[3] by charging a carry control node based on the second carry signal CR[2] and the inverted clock signal CLKb and by performing a bootstrapping operation on the carry control node based on the low clock signal CLKL, and may output a third emission signal EM[3] by charging an emitting control node based on the inverted low clock signal CLKLb and the inverted clock signal CLKb and by performing a bootstrapping operation on the emission control node based on the low clock signal CLKL. Further, a fourth stage STG4 may output a fourth carry signal CR[4] by charging a carry control node based on the third carry signal CR[3] and the clock signal CLK and by performing a bootstrapping operation on the carry control node based on the inverted low clock signal CLKLb, and may output a fourth emission signal EM[4] by charging an emitting control node based on the low clock signal CLKL and the clock signal CLK and by performing a bootstrapping operation on the emission control node based on the inverted low clock signal CLKLb.

In some embodiments, each stage STG1, STG2, STG3, STG4, . . . of the emission driver 270 may output the emitting signal EM having one pulse in each frame period. In other embodiments, as illustrated in FIG. 15, each stage STG1, STG2, STG3, STG4, . . . may output the emitting signal EM having multiple pulses (e.g., four pulses) in each frame period FP. For example, the emission signal EM may have multi-cycles in each frame period FP. The emission driver 270 according to embodiments may output the emission signal EM having the multi-cycles in each frame period FP.

The controller (e.g., a timing controller (TCON)) 290 may receive input image data IDAT and a control signal CTRL from an external host processor (e.g., an application processor (AP), a graphics processing unit (GPU) or a graphics card). In some embodiments, the control signal CTRL may include, but not limited to, a vertical synchronization signal, a horizontal synchronization signal, an input data enable signal, a master clock signal, etc. The controller 290 may generate the output image data ODAT, the data control signal DCTRL, the scan control signal SCTRL and the emission control signal EMCTRL based on the input image data IDAT and the control signal CTRL. The controller 290 may control an operation of the data driver 230 by providing the output image data ODAT and the data control signal DCTRL to the data driver 230, may control an operation of the scan driver 250 by providing the scan control signal SCTRL to the scan driver 250, and may control an operation of the emission driver 270 by providing the emission control signal EMCTRL to the emission driver 270.

Figure 16:
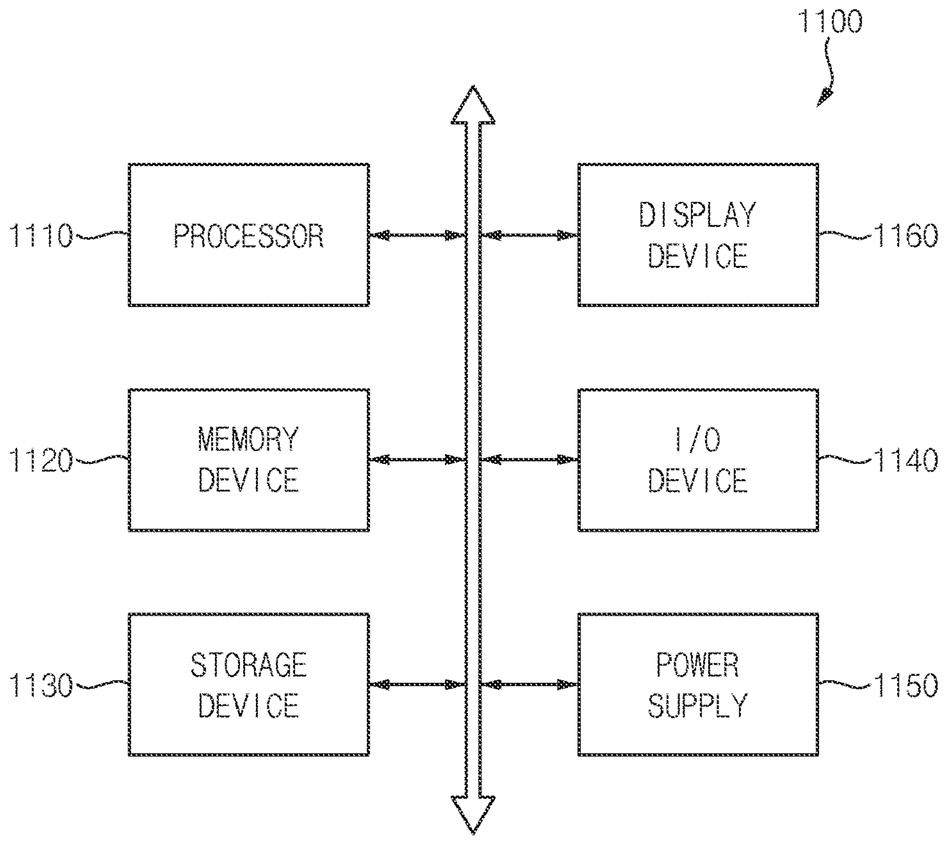
FIG. 16 is an electronic device including a display device according to embodiments.

FIG. 16 is an electronic device including a display device according to embodiments. Referring to FIG. 16, an electronic device 1100 may include a processor 1110, a memory device 1120, a storage device 1130, an input/output (I/O) device 1140, a power supply 1150, and a display device 1160. The electronic device 1100 may further include multiple ports for communicating with a video card, a sound card, a memory card, a universal serial bus (USB) device, other electric devices, etc.

The processor 1110 may perform various computing functions or tasks. The processor 1110 may be an application processor (AP), a micro processor, a central processing unit (CPU), etc. The processor 1110 may be electrically connected to other components via an address bus, a control bus, a data bus, etc. Further, in some embodiments, the processor 1110 may be further electrically connected to an extended bus such as a peripheral component interconnection (PCI) bus.

The memory device 1120 may store data for operations of the electronic device 1100. For example, the memory device 1120 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc., and/or at least one volatile memory device such as a dynamic random access memory (DRAM) device, a static random access memory (SRAM) device, a mobile dynamic random access memory (mobile DRAM) device, etc.

The storage device 1130 may be a solid state drive (SSD) device, a hard disk drive (HDD) device, a CD-ROM device, etc. The I/O device 1140 may be an input device such as a keyboard, a keypad, a mouse, a touch screen, etc., and an output device such as a printer, a speaker, etc. The power supply 1150 may supply power for operations of the electronic device 1100. The display device 1160 may be electrically connected to other components through the buses or other communication links.

In each stage of an emission driver of the display device 1160, a carry control node for outputting a carry signal and an emission control node for outputting an emission signal may be separated from each other. Further, a second low gate voltage that may be used as a low voltage of an input signal and the carry and emission control nodes may be lower that a first low gate voltage that is used as a low voltage of the emission signal. Further, transistors between each of the carry and emission control nodes and a second low voltage line transferring the second low gate voltage may have a STT structure. Further, a twelfth transistor outputting the second low gate voltage as the carry signal may be repeatedly turned on and off in response to an inverted low clock signal. Accordingly, operation reliability of the emission driver of the display device 1160 according to embodiments may be improved.

The inventive concepts may be applied to any display device 1160, and any electronic device 1100 including the display device 1160. For example, the inventive concepts may be applied to a mobile phone, a smart phone, a wearable electronic device, a tablet computer, a television (TV), a digital TV, a 3D TV, a personal computer (PC), a home appliance, a laptop computer, a personal digital assistant (PDA), a portable multimedia player (PMP), a digital camera, a music player, a portable game console, a navigation device, etc.

The foregoing may be illustrative of embodiments and may not be to be construed as limiting thereof. Although a few embodiments have been described, those skilled in the art will readily appreciate that many modifications are possible in the embodiments without materially departing from the novel teachings and advantages of the inventive concept. Accordingly, all such modifications are intended to be included within the scope of the inventive concept as defined in the claims. Therefore, it is to be understood that the foregoing is illustrative of various embodiments and may not be to be construed as limited to the specific embodiments disclosed, and that modifications to the disclosed embodiments, as well as other embodiments, are intended to be included within the scope of the appended claims.

What is claimed is:

1. An emission driver including:

a plurality of stages, at least one of the plurality of stages comprising:

a carry node charging circuit that charges a carry control node based on a previous carry signal and an inverted clock signal;

an emission node charging circuit that charges an emission control node based on an inverted low clock signal and the inverted clock signal;

a carry node discharging circuit that discharges the carry control node based on a next carry signal, a voltage of the emission control node and a second low gate voltage;

an emission node discharging circuit that discharges the emission control node based on a voltage of the carry control node and the second low gate voltage; and an output circuit that performs a bootstrapping operation on the carry control node that is charged to a high gate voltage, outputs a carry signal based on the voltage of the carry control node on which the bootstrapping operation is performed, performs a bootstrapping operation on the emission control node that is charged to the high gate voltage, and outputs an emission signal based on the voltage of the emission control node on which the bootstrapping operation is performed.

2. The emission driver of claim 1, wherein the output circuit includes:

a first capacitor that is used to perform the bootstrapping operation on the carry control node; and a second capacitor that is used to perform the bootstrapping operation on the emission control node.

3. The emission driver of claim 2, wherein the first capacitor includes:

a first electrode electrically connected to the carry control node; and a second electrode electrically connected to a carry output node at which the carry signal is output, and wherein the second capacitor includes:

a first electrode receiving a low clock signal; and a second electrode electrically connected to the emission control node.

4. The emission driver of claim 1, wherein the carry node charging circuit transfers the inverted clock signal to the carry control node in response to the previous carry signal.

5. The emission driver of claim 1, wherein the carry node charging circuit includes:

a first transistor including a gate receiving the previous carry signal;

a first terminal receiving the inverted clock signal; and a second terminal electrically connected to the carry control node.

6. The emission driver of claim 1, wherein the emission node charging circuit transfers the inverted clock signal to the emission control node in response to the inverted low clock signal.

7. The emission driver of claim 1, wherein the emission node charging circuit includes:

a first transistor including a gate receiving the inverted low clock signal;

a first terminal receiving the inverted clock signal; and a second terminal electrically connected to the emission control node.

8. The emission driver of claim 1, wherein the carry node discharging circuit transfers the second low gate voltage to the carry control node in response to the next carry signal, and the second low gate voltage to the carry control node in response to the voltage of the emission control node.

9. The emission driver of claim 1, wherein the carry node discharging circuit includes:

a first transistor including a gate receiving the next carry signal, a first terminal electrically connected to the carry control node, and a second terminal electrically connected to a first intermediate node;

a second transistor including a gate receiving the next carry signal, a first terminal electrically connected to the first intermediate node, and a second terminal receiving the second low gate voltage;

a third transistor including a gate electrically connected to the emission control node, a first terminal electrically connected to the carry control node, and a second terminal electrically connected to the first intermediate node; and a fourth transistor including a gate electrically connected to the emission control node, a first terminal electrically connected to the first intermediate node, and a second terminal receiving the second low gate voltage.

10. The emission driver of claim 9, wherein the carry node discharging circuit further includes:

a fifth transistor including a gate electrically connected to the carry control node;

a first terminal receiving the high gate voltage; and a second terminal electrically connected to the first intermediate node.

11. The emission driver of claim 1, wherein the emission node discharging circuit transfers the second low gate voltage to the emission control node in response to the voltage of the carry control node.

12. The emission driver of claim 1, wherein the emission node discharging circuit includes:

a first transistor including a gate electrically connected to the carry control node, a first terminal electrically connected to the emission control node, and a second terminal electrically connected to a second intermediate node; and a second transistor including a gate electrically connected to the carry control node, a first terminal electrically connected to the second intermediate node, and a second terminal receiving the second low gate voltage.

13. The emission driver of claim 12, wherein a voltage difference between the voltage of the emission control node on which the bootstrapping operation is performed and the second low gate voltage is distributed among the first transistor and the second transistor.

14. The emission driver of claim 12, wherein the emission node discharging circuit further includes:

a third transistor including a gate electrically connected to the emission control node;

a first terminal receiving the high gate voltage; and a second terminal electrically connected to the second intermediate node.

15. The emission driver of claim 1, wherein the output circuit outputs the high gate voltage as the carry signal in response to the voltage of the carry control node on which the bootstrapping operation is performed, the second low gate voltage as the carry signal in response to the inverted low clock signal, the high gate voltage as the emission signal in response to the voltage of the emission control node on which the bootstrapping operation is performed, and a first low gate voltage as the emission signal in response to the voltage of the carry control node.

16. The emission driver of claim 15, wherein the second low gate voltage is lower than the first low gate voltage.

17. The emission driver of claim 1, wherein the output circuit includes:

a first capacitor including a first electrode electrically connected to the carry control node, and a second electrode electrically connected to a carry output node at which the carry signal is output;

a first transistor including a gate electrically connected to the carry control node, a first terminal receiving a low clock signal, and a second terminal electrically connected to the carry output node;

a second transistor including a gate receiving the inverted low clock signal, a first terminal electrically connected to the carry output node, and a second terminal receiving the second low gate voltage;

a second capacitor including a first electrode receiving the low clock signal, and a second electrode electrically connected to the emission control node;

a third transistor including a gate electrically connected to the emission control node, a first terminal receiving the high gate voltage, and a second terminal electrically connected to an emission output node at which the emission signal is output; and a fourth transistor including a gate receiving the carry control node, a first terminal electrically connected to the emission output node, and a second terminal receiving a first low gate voltage.

18. The emission driver of claim 17, wherein the second transistor is repeatedly turned on and off in response to the inverted low clock signal.

19. An emission driver including:

a plurality of stages, at least one of the plurality of stages comprising:

a first transistor including a gate receiving a previous carry signal, a first terminal receiving an inverted clock signal, and a second terminal electrically connected to a carry control node;

a second transistor including a gate receiving a next carry signal, a first terminal electrically connected to the carry control node, and a second terminal electrically connected to a first intermediate node;

a third transistor including a gate receiving the next carry signal, a first terminal electrically connected to the first intermediate node, and a second terminal receiving a second low gate voltage;

a fourth transistor including a gate electrically connected to the carry control node, a first terminal receiving a high gate voltage, and a second terminal electrically connected to the first intermediate node;

a fifth transistor including a gate receiving an inverted low clock signal, a first terminal receiving the inverted clock signal, and a second terminal electrically connected to an emission control node;

a sixth transistor including a gate electrically connected to the emission control node, a first terminal electrically connected to the carry control node, and a second terminal electrically connected to the first intermediate node;

a seventh transistor including a gate electrically connected to the emission control node, a first terminal electrically connected to the first intermediate node, and a second terminal receiving the second low gate voltage;

an eighth transistor including a gate electrically connected to the emission control node, a first terminal receiving the high gate voltage, and a second terminal electrically connected to a second intermediate node;

a ninth transistor including a gate electrically connected to the carry control node, a first terminal electrically connected to the emission control node, and a second terminal electrically connected to the second intermediate node;

a tenth transistor including a gate electrically connected to the carry control node, a first terminal electrically connected to the second intermediate node, and a second terminal receiving the second low gate voltage;

a first capacitor including a first electrode electrically connected to the carry control node, and a second electrode electrically connected to a carry output node;

an eleventh transistor including a gate electrically connected to the carry control node, a first terminal receiving a low clock signal, and a second terminal electrically connected to the carry output node;

a twelfth transistor including a gate receiving the inverted low clock signal, a first terminal electrically connected to the carry output node, and a second terminal receiving the second low gate voltage;

a second capacitor including a first electrode receiving the low clock signal, and a second electrode electrically connected to the emission control node;

a thirteenth transistor including a gate electrically connected to the emission control node, a first terminal receiving the high gate voltage, and a second terminal electrically connected to an emission output node; and a fourteenth transistor including a gate receiving the carry control node, a first terminal electrically connected to the emission output node, and a second terminal receiving a first low gate voltage.

20. A display device comprising:

a display panel including a plurality of pixels;

a data driver that provides a plurality of data signals to the plurality of pixels;

a scan driver that provides a plurality of scan signals to the plurality of pixels;

an emission driver including a plurality of stages that provides a plurality of emission signals to the plurality of pixels; and a controller that controls the data driver, the scan driver and the emission driver, wherein at least one of the plurality of stages includes:

a carry node charging circuit that charges a carry control node based on a previous carry signal and an inverted clock signal;

an emission node charging circuit that charges an emission control node based on an inverted low clock signal and the inverted clock signal;

a carry node discharging circuit that discharges the carry control node based on a next carry signal, a voltage of the emission control node and a second low gate voltage;

an emission node discharging circuit that discharges the emission control node based on a voltage of the carry control node and the second low gate voltage; and an output circuit that performs a bootstrapping operation on the carry control node that is charged to a high gate voltage, outputs a carry signal based on the voltage of the carry control node on which the bootstrapping operation is performed, performs a bootstrapping operation on the emission control node that is charged to the high gate voltage, and outputs a corresponding one of the plurality of emission signals based on the voltage of the emission control node on which the bootstrapping operation is performed.

* * * * *